(12) United States Patent
Terada et al.

(10) Patent No.: US 8,220,576 B2
(45) Date of Patent: Jul. 17, 2012

(54) FRONT END STRUCTURE FOR AUTOMOBILE

(75) Inventors: Sakayu Terada, Hiroshima (JP);
Nobuyuki Nakayama, Aki-gun (JP);
Takahiro Tochioka, HigashiHiroshima (JP)

(73) Assignee: Mazda Motor Corporation (JP)

( * ) Notice: Subject to any disclaimer, the term of this patent is extended or adjusted under 35 U.S.C. 154(b) by 902 days.

(21) Appl. No.: 12/207,568

(22) Filed: Sep. 10, 2008

(65) Prior Publication Data

US 2009/0085373 A1  Apr. 2, 2009

(30) Foreign Application Priority Data

Oct. 1, 2007  (JP) .................................. 2007-257098
Oct. 1, 2007  (JP) .................................. 2007-257099

(51) Int. Cl.
*B60K 11/04* (2006.01)
*B60J 7/00* (2006.01)
*B60R 19/34* (2006.01)
*B60R 19/04* (2006.01)

(52) U.S. Cl. ............. 180/68.4; 296/187.09; 296/193.09; 296/203.02; 293/133; 293/155

(58) Field of Classification Search .................. 180/68.4; 296/187.09, 193.09, 203.02; 293/133, 155
See application file for complete search history.

(56) References Cited

U.S. PATENT DOCUMENTS

| 6,216,810 | B1 | 4/2001 | Nakai et al. |
| 6,364,403 | B1 * | 4/2002 | Ozawa et al. ............. 296/187.09 |
| 6,412,581 | B2 * | 7/2002 | Enomoto et al. ............. 180/68.4 |
| 6,705,653 | B2 * | 3/2004 | Gotanda et al. ............... 293/132 |
| 6,814,381 | B1 * | 11/2004 | Frank .............................. 293/133 |
| 7,044,246 | B2 * | 5/2006 | Fujieda ........................ 180/68.4 |
| 7,246,674 | B2 * | 7/2007 | Andritter et al. ............. 180/68.4 |
| 7,766,112 | B2 * | 8/2010 | Kapadia et al. .............. 180/68.4 |
| 2004/0195020 | A1 * | 10/2004 | Suwa et al. .................. 180/68.4 |
| 2006/0213639 | A1 * | 9/2006 | Kobayashi et al. ............. 165/67 |
| 2007/0182211 | A1 | 8/2007 | Sub |

FOREIGN PATENT DOCUMENTS

| CN | 1876423 A | 12/2006 |
| EP | 1 232 931 A1 | 8/2002 |
| EP | 1860020 A1 | 11/2007 |
| JP | 10264855 | 10/1998 |
| JP | 2000-177633 A | 6/2000 |
| JP | 2002-240744 A | 8/2002 |
| JP | 2004-217028 A | 8/2004 |
| JP | 2004-217119 A | 8/2004 |

(Continued)

OTHER PUBLICATIONS

European Search Report issued on Mar. 30, 2009; Application No./Patent No. 08017300.8-1268/2045170.

*Primary Examiner* — J. Allen Shriver, II
*Assistant Examiner* — James M Dolak
(74) *Attorney, Agent, or Firm* — Studebaker & Brackett PC; Donald R. Studebaker

(57) ABSTRACT

A front end structure for an automobile includes a resin-made shroud panel supporting a heat exchanger. The front end structure further includes: a panel support part supporting the shroud panel against car body members; and a rearward movement allowing part allowing the heat exchanger to move rearward of the automobile relative to the panel support part when an impact load works on the shroud panel from the front of the automobile.

13 Claims, 23 Drawing Sheets

FOREIGN PATENT DOCUMENTS

| | | |
|---|---|---|
| JP | 2005-35407 A | 2/2005 |
| JP | 2005-219531 A | 8/2005 |
| JP | 2005-219590 A | 8/2005 |
| JP | 2007-1563 A | 1/2007 |
| JP | 2007-91000 A | 4/2007 |
| WO | 2009019372 A1 | 2/2009 |

* cited by examiner

FRONT END STRUCTURE FOR AUTOMOBILE

CROSS REFERENCE TO RELATED APPLICATIONS

This non-provisional application claims priority under 35 U.S.C. §119(a) on Patent Applications No. 2007-257098 and No. 2007-257099 filed in Japan on Oct. 1, 2007, the entire contents of which are hereby incorporated by reference.

BACKGROUND OF THE INVENTION

1. Field of the Invention

The present invention relates to front end structures for automobiles and particularly relates to a front end structure for an automobile including a resin-made shroud panel supporting a heat exchanger, such as a radiator or the like.

2. Description of Related Art

Conventionally, there has been known an automobile front end structure using a resin-made shroud panel for supporting a heat exchanger, such as a radiator or the like. This front end structure enables the automobile front end part to be a module (a unit) to increase the workability of vehicle assembling and is therefore employed in various automobiles recently.

However, the resin-made shroud panel, which has insufficient rigidity, may support a bonnet and the like insufficiently.

To tackle this problem, a metal-made reinforcing member is integrally formed with an upper member extending in the car width direction in the upper part of the shroud panel to obtain a resin-made shroud panel of which upper part has rigidity equivalent to a metal-made one, as disclosed in U.S. Pat. No. 6,216,810.

The upper part of such the shroud panel is fastened and fixed to apron rein members above the engine compartment, so that an impact load from the front at head-on collision of the automobile is transmitted from the shroud panel to the apron rein members to thus be distributed, thereby enhancing the safety performance at collision of the automobile.

Recently, in association with growing demand for large compartments and large engines, the space in the engine compartment is decreasing. Accordingly, it is a trend to forward layout of the heat exchanger supported by the shroud panel.

On the other hand, there is a demand for increased safety in automobile maneuver by shortening the front over hang of the automobiles as far as possible, with a result that the front bumper is arranged more rearward.

Under the above circumstances, recently, there are an increased number of automobiles employing a layout structure in which the heat exchanger is arranged immediately behind the front bumper.

In the case where such the layout structure is employed, however, rearward arrangement of the front bumper leads to immediate breakage of the heat exchanger even at light collision, thereby necessitating replacement with a new heat exchanger, which is expensive, to lead to an increase in repair cost.

To solve this problem, a structure may be employed in which the supporting rigidity of the shroud panel is lowered so that the shroud panel is allowed to retreat as a whole at light collision together with the front bumper.

Employment of this structure, however, inhibits the impact load at heavy collision from being distributed and transmitted from the shroud panel to the car body members, such as the apron rein members, and the like. This presents a new problem of lowering of the safety performance at collision of the automobile.

SUMMARY OF THE INVENTION

The present invention has been made in view of the foregoing and has its object of reducing repair cost by ensuring load distribution performance to a car body at heavy collision and preventing the heat exchanger and the shroud panel from being broken at light collision as far as possible in a front end structure for an automobile including a resin-made shroud panel supporting a heat exchanger.

To attain the above object, the present invention provides a front end structure for an automobile which includes: a resin-made shroud panel for supporting a heat exchanger which includes: an upper part extending in a car width direction; a lower part extending in the car width direction; and two side parts extending in a vertical direction to connect the upper part and the lower part; a front bumper including a bumper beam extending in the car width direction on an automobile front side of the shroud panel; a panel support part supporting the shroud panel against car body members; and a rearward movement allowing part which allows the heat exchanger to move rearward of the automobile relative to the panel support part when an impact load works on the shroud panel from front of the automobile.

With the above arrangement, the front bumper (the bumper beam) retreats upon head-on collision of the automobile so that the impact load works on the shroud panel. When the collision is light, the rearward movement allowing part allows the heat exchanger to move rearward relative to the panel support part to prevent interference of the heat exchanger with the bumper beam. On the other hand, when the collision is heavy, joint of the panel support part to, for example, the left and right front side frames and the apron rein member leads to distribution and transmission of the impact load working on the right and left side frames to the apron rein members through the panel support part.

In the above automobile front end structure, preferably, the panel support part extends in the car width direction above the shroud panel, and the rearward movement allowing part fixes the upper part of the shroud panel to the panel support part and allows, when the impact load works on the shroud panel from the front of the automobile, the upper part to separate from the panel support part.

With the above arrangement, the upper part fixed to the panel support part separates from the panel support part upon light collision to allow the shroud panel to retreat readily, thereby preventing interference of the shroud panel and the heat exchanger with the bumper beam.

In the above automobile front end structure, the panel support part preferably includes: right and left side members respectively including rear end parts fixed to front end parts of respective right and left apron rein members as two of the car body members and front end parts located above front end parts of respective right and left front side frames as two of the car body members; right and left vertical members respectively including upper end parts fixed to the front end parts of the respective right and left side members and lower end parts fixed to the front end parts of the respective right and left front side frame; and a center member extending in the car width direction to connect the light and left side members, the center member being detachably fastened and fixed to the right and left side members.

This ensures distribution and transmission of the impact load at heavy collision working on the right and left front side frames to the apron rein members through the panel support part. Further, the shroud panel can be mounted from above of the automobile with the center member taken off. Accordingly, even though the panel support part is present above the shroud panel, the degree of freedom of workability in automobile assembling is enhanced.

The center member part is preferably capable of being fixed provisionally to an upper face of the upper part of the shroud panel before being mounted to the automobile.

This enables mounting of the center member from above of the automobile as a unit united with the shroud panel. Hence, the operation man hour in the main line of an automobile assembly line can be reduced to shorten the time required for assembling.

In the above automobile front end structure, preferably, the side parts of the shroud panel are fixed to the bumper beam.

With the above arrangement, the shroud panel retreats concurrently with retreat of the front bumper upon head-on collision of the automobile. As a result, the heat exchanger supported by the shroud panel does not interfere with the bumper beam to prevent definitely the heat exchanger from being broken. Hence, reduction in repair cost can be contemplated.

In the above automobile front end structure, it is preferable that: the panel support part includes a main body in a substantially reverse U shape in section along a longitudinal direction of the automobile and front and rear flanges formed at sides in the longitudinal direction of the automobile of the main body; and the rearward movement allowing part includes a joint member for fastening and fixing the upper part of the shroud panel to at least one of the flanges.

In this arrangement, formation of a joint hole to which the joint member is inserted involves less or no influence of rigidity lowering of the panel support part, thereby preventing the rigidity of the panel support part from lowering. Hence, the shroud panel can be fastened and fixed to the panel support part with no lowering of the load transmission performance of the panel support part at heavy collision invited.

In the case where the rearward movement allowing part includes the joint member, it is preferable that: the joint member fastens and fixes the upper part of the shroud panel to the rear flange; a notch which is opened to rear of the automobile and through which the joint member is inserted is formed at a joint part by the joint member in the rear flange; and the rearward movement allowing part allows the upper part of the shroud panel to separate from the panel support part by separating the joint member from the notch when the impact load works on the shroud panel from the front of the automobile.

With the above arrangement, the shroud panel can separate from the panel support part through the notch when the impact load works on the shroud panel. Accordingly, such a simple structure with the notch formed leads to easy separation of the shroud panel.

In the case where the rearward movement allowing part includes the joint part, it is preferable that: the joint member fastens and fixes the upper part of the shroud panel to the front flange; a notch which is opened to the front of the automobile and through which the joint member is inserted is formed at a joint part by the joint member in the upper part of the shroud panel; and the rearward movement allowing part allows the upper part of the shroud panel to separate from the panel support part by separating the joint member from the notch when the impact load works on the shroud panel from the front of the automobile.

This simple arrangement enables the shroud panel to separate readily.

In the above automobile front end structure, it is preferable to provide a pocket part for accommodating a bonnet locking mechanism locking a bonnet of the automobile in the panel support part.

With the above arrangement, even when the shroud panel separates and retreats from the panel support part at head-on collision of the automobile, the bonnet locking mechanism is prevented from retreating. Hence, the bonnet supporting rigidity of the bonnet locking mechanism at collision is increased.

In the case where the pocket portion is provided, it is preferable that a fixing flange is formed in a lower part of the pocket part, the fixing flange being fixed to the upper part of the shroud panel and capable of being released from the fixing when the impact load works on the shroud panel from the front of the automobile.

In the above arrangement, the supporting rigidity of the pocket part is increased, and the supporting rigidity of the bonnet locking mechanism is also increased by using the shroud panel. At head-on collision of the automobile, the fixing flange is released from being fixed, which inhibits no retreat of the shroud panel. Hence, both an increase in supporting rigidity of the bonnet locking mechanism and promotion of retreat of the shroud panel at collision can be contemplated.

In the above automobile front end structure, it is preferable that: crash boxes are provided at the front ends of right and left front side frames of the automobile; the bumper beam is mounted to the right and left front side frames through the crash boxes; and the shroud panel is overlapped with the crash boxes when viewed from a side of the automobile.

With the above arrangement, the shroud panel can retreat rearward definitely when the crash boxes are buckled and deformed upon head-on collision of the automobile. This further promotes retreat of the shroud panel at collision. Thus, the shroud panel can retreat at collision further definitely, thereby contemplating protection of the heat exchanger.

In the above automobile front end structure, it is preferable that: the panel support part is composed of a reinforcing part integrally formed with the shroud panel and including a metal-made reinforcement; and the shroud panel includes: a heat exchanger support part including a front end located ahead of the reinforcing part and supporting the heat exchanger; and a fragile part as the rearward movement allowing part which is formed at a boundary part between the reinforcing part and the heat exchanger support part, the fragile part allowing the heat exchanger support part and the heat exchanger to move rearward of the automobile relative to the reinforcing part when the impact load works on the heat exchanger support part of the shroud panel from the front of the automobile.

With the above arrangement, the front bumper retreats upon head-on collision of the automobile to cause the impact load to work on the heat exchanger support part. In the case of light collision, deformation or the like of the fragile part causes the heat exchanger support part to shift relative to the reinforcing part, which causes the heat exchanger support part and the heat exchanger to retreat, thereby preventing interference with the bumper beam. On the other hand, in the case of heavy collision, the impact load also works on the reinforcing part to be distributed and transmitted to the car body members through the reinforcing part.

In the above automobile front end structure, it is preferable that the fragile part forms a thin part or a slit part at the boundary part between the reinforcing part and the heat exchanger support part.

With the above arrangement, the fragile part is broken when the heat exchanger support part receives the impact load to cause the heat exchanger support part and the heat exchanger to shift rearward relative to the reinforcing part. Further, the fragile part can be formed simultaneously with formation of the resin-made shroud panel. Thus, the heat exchanger support part is allowed to retreat readily at head-on collision of the automobile, and no lowering of the productivity of the shroud panel is invited.

The fragile part may be composed of a rubber member at the boundary part between the reinforcing part and the heat exchanger support part.

With the above arrangement, the fragile part is elastically deformed when the heat exchanger support part receives the impact load to cause the heat exchanger support part and the heat exchanger to shift rearward relative to the reinforcing part. This retreat of the heat exchanger support part and the heat exchanger involves no breakage of the shroud panel. Hence, light collision necessitates no replacement of not only the heat exchanger but also the shroud panel, thereby contemplating reduction in repair cost.

In the above automobile front end structure, it is preferable that: the reinforcing part is continuously formed from the upper part to the side parts of the shroud panel; the right and left side parts of the reinforcing part at the upper part are fixed to right and left apron rein members as two of the car body members, respectively; and the reinforcing member at the side parts is fixed to corresponding right and left front side frames as two of the car body members.

With the above arrangement, the impact load at heavy collision, which works on the right and left front side frames through the bumper beam, can be distributed and transmitted to the apron rein members through the reinforcing part. Hence, load distribution at heavy collision can be performed appropriately on the car body members arranged thereabove and therebelow to increase safety performance at collision of the automobile.

It is further preferable that the reinforcing part is formed in a frame-like shape at the upper part, the lower part, and the side parts.

This increases the withstanding capacity of the frame-like reinforcing part. As a result, the impact load working on the front side frames can be distributed and transmitted definitely to the apron rein members through the reinforcing part. This ensures appropriate load distribution at heavy collision to increase the safety performance at collision of the automobile further.

In the case where the reinforcing part is formed in a frame shape as above, the reinforcing part at the lower part is preferably fixed to a suspension cross member, as one of the car body members, supporting a suspension device.

The above arrangement fixes the position of the reinforcing part at the lower part to cause the heat exchanger support part to shift relative to the reinforcing part further definitely at light collision. In addition, the impact load at heavy collision can be transmitted to the suspension cross member through the lower part of the reinforcing part to contemplate further distribution of the impact load. With the use of the suspension cross member, the protection performance for the heat exchanger at light collision and the load distribution performance at heavy collision can be enhanced further.

Preferably, a bonnet locking mechanism for locking a bonnet of the automobile is provided at the reinforcing part at the upper part.

This arrangement prevents the bonnet locking mechanism from retreating even when the heat exchanger support part retreats upon head-on collision of the automobile. Accordingly, the heat exchanger is prevented from being broken at collision while the bonnet supporting rigidity of the bonnet locking mechanism at collision can be increased.

In the above automobile front end structure, preferably, the heat exchanger support part includes an upper frame part extending in the car width direction, a lower frame part extending in the car width direction, and side frame parts extending in a vertical direction to connect the upper frame part and the lower flame part, the side frame parts being fixed to the bumper beam.

With the above arrangement, the frame-like heat exchanger support part retreats definitely accompanied by retreat of the front bumper (the bumper beam) at head-on collision of the automobile. Accordingly, the heat exchanger supported by the heat exchanger support part never interfere with the bumper beam at collision to prevent the heat exchanger from being broken. Thus, the heat exchanger is prevented definitely from being broken to contemplate reduction in repair cost.

In the above automobile front end structure, it is preferable that crash boxes are provided at front end parts of right and left front side frames of the automobile; the bumper beam is mounted to the right and left front side frames through the crash boxes; and the reinforcing part is fixed to members as two of the car body members which are located on an automobile rear side of the crash boxes.

With the above arrangement, the reinforcing part can be fixed firmly to the car body members without inviting influence of the crash boxes which are buckled and deformed upon head-on collision of the automobile. Accordingly, the reinforcing part will not shift at light collision, and therefore, relative shifts can be caused between the reinforcing part and the heat exchanger support part to cause the fragile part to be deformed or so definitely. In addition, the impact load at heavy collision can be transmitted appropriately to the car body members, thereby enhancing the load distribution performance.

PREFERRED EMBODIMENTS OF THE INVENTION

Embodiments of the present invention will be described below with reference to the accompanying drawings. It should be noted that the following preferred embodiments are mere essential examples and are not intended to limit the present invention and the applicable objects and usage thereof.

Embodiment 1

Figure 1:
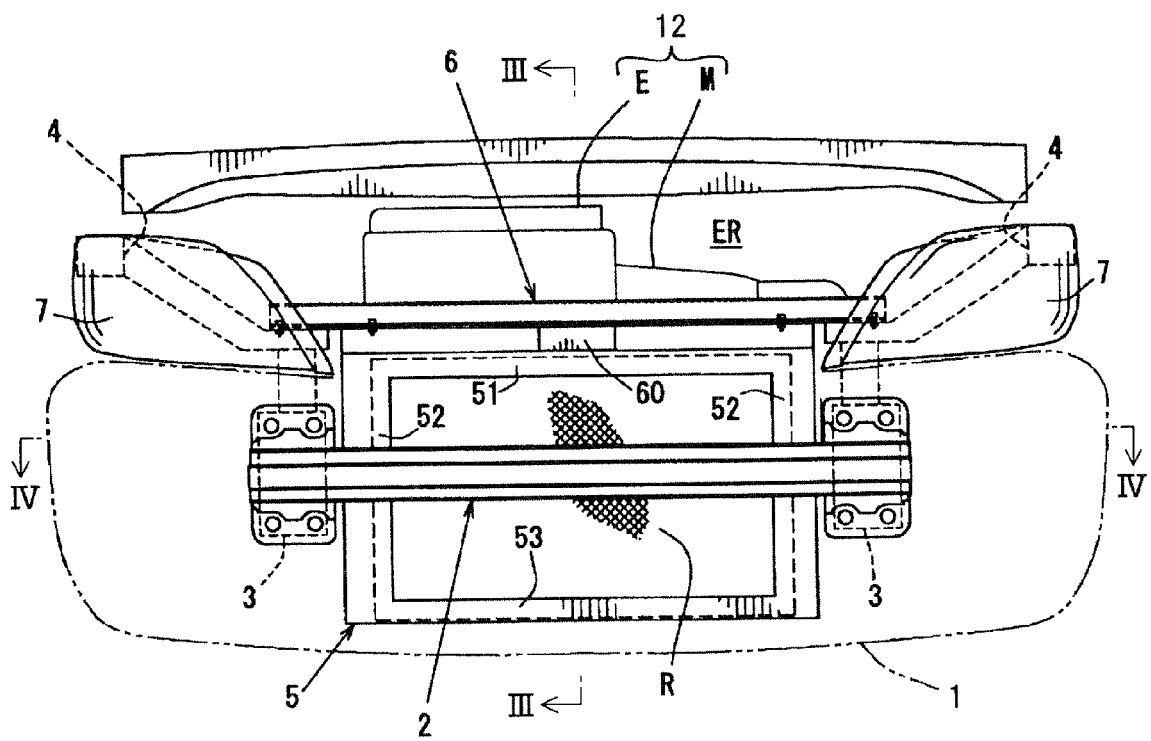
FIG. 1 is a front view of an automobile employing a front end structure in accordance with Embodiment 1 of the present invention.
Figure 2:
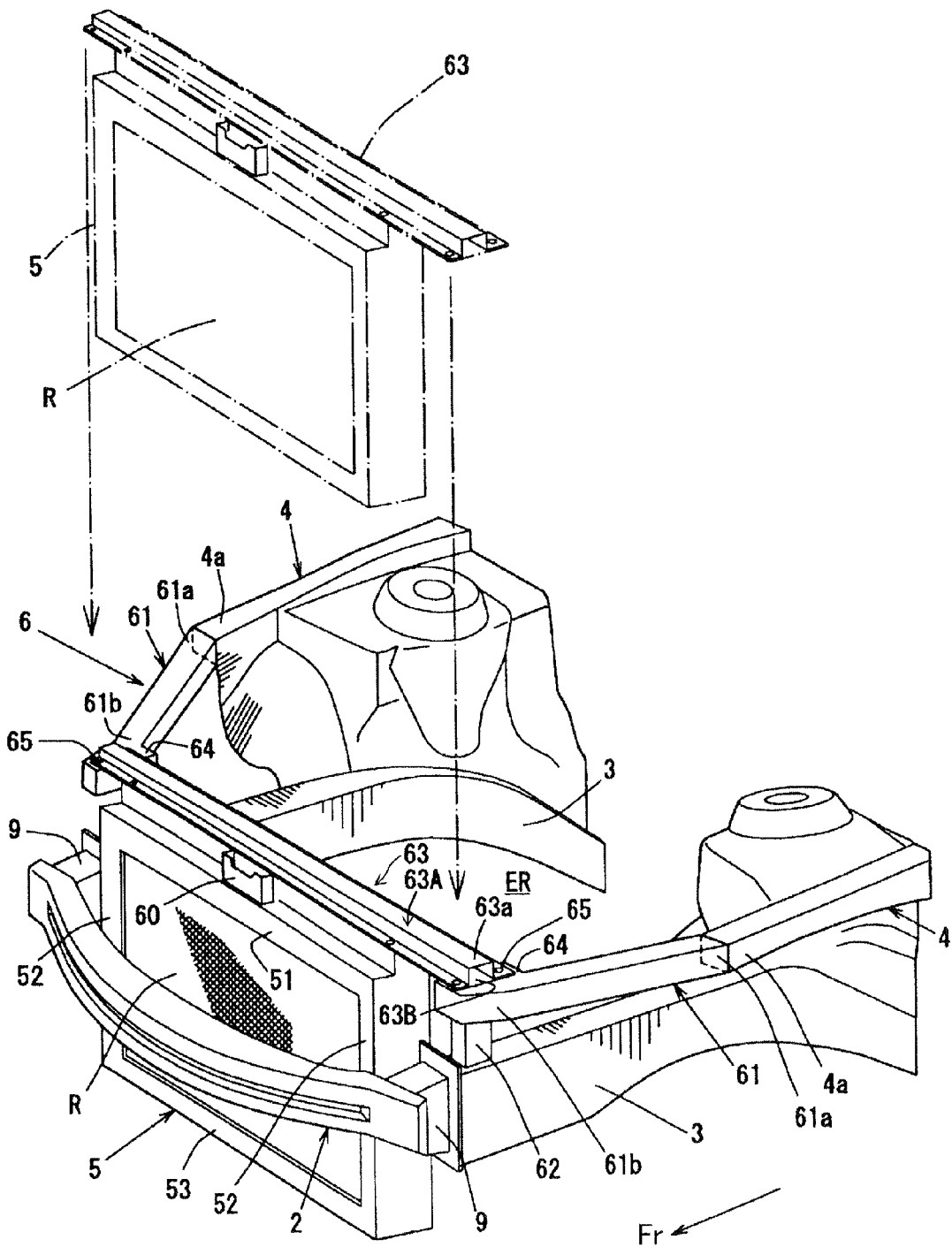
FIG. 2 is a perspective view of a front end part of the automobile.
Figure 3:
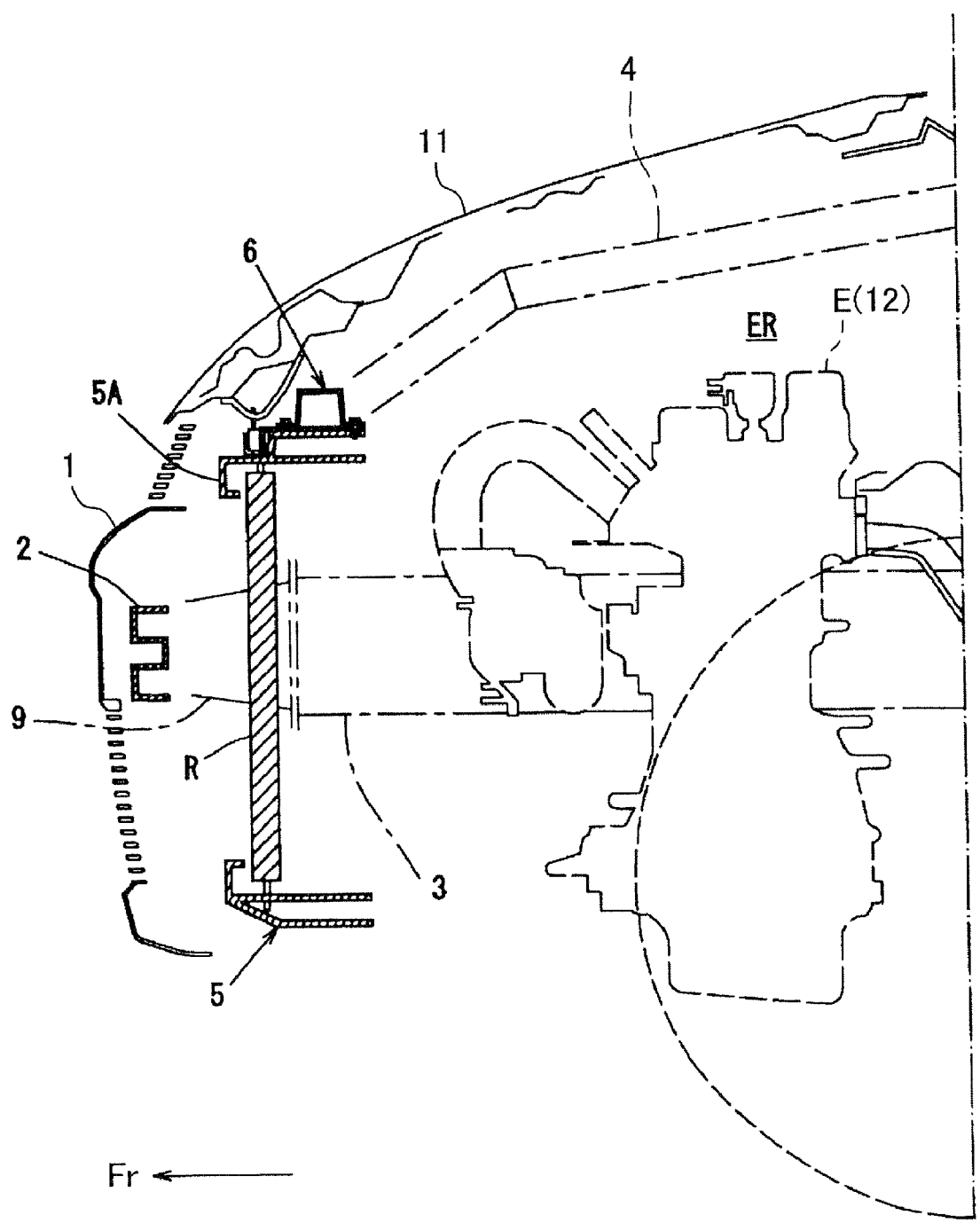
FIG. 3 is a sectional view taken along the line III-III in FIG. 1.
Figure 4:
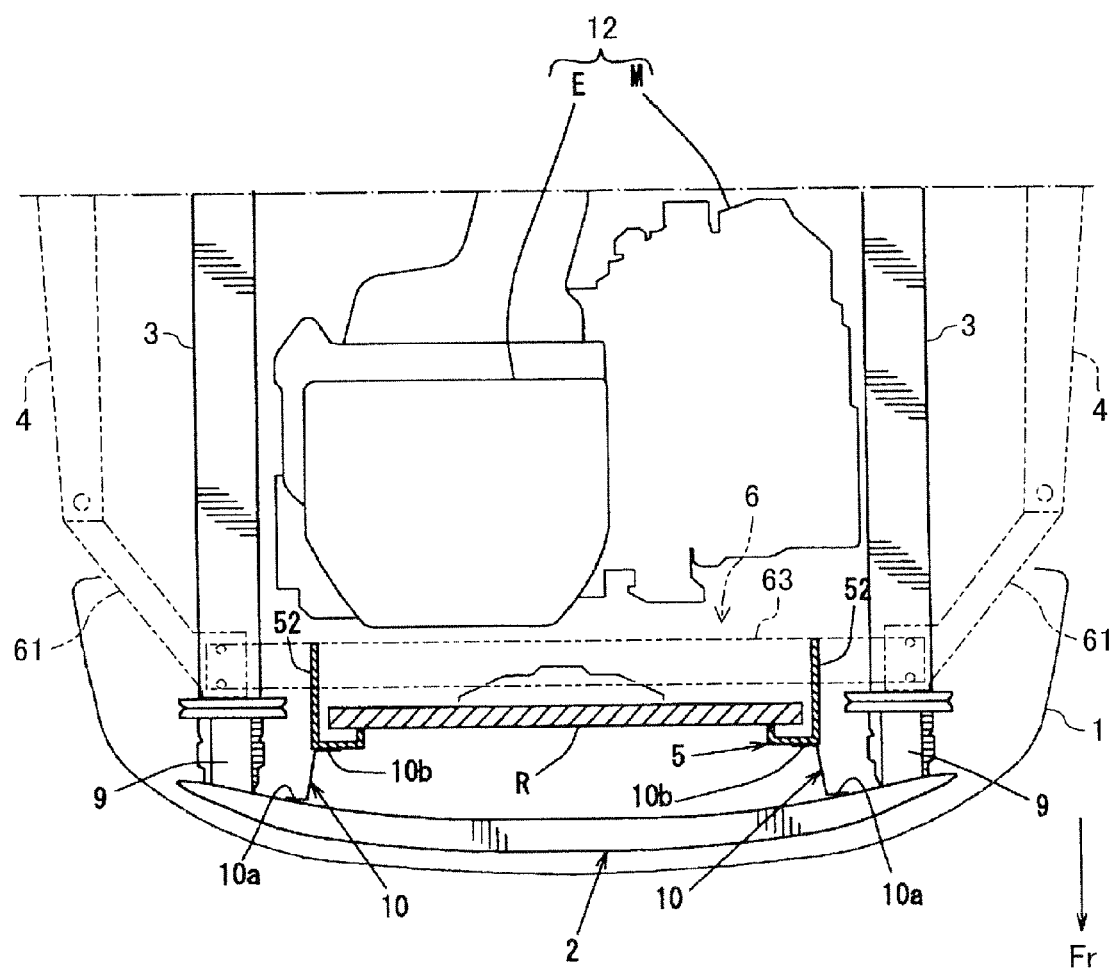
FIG. 4 is a sectional view taken along the line IV-IV in FIG. 1.
Figure 5:
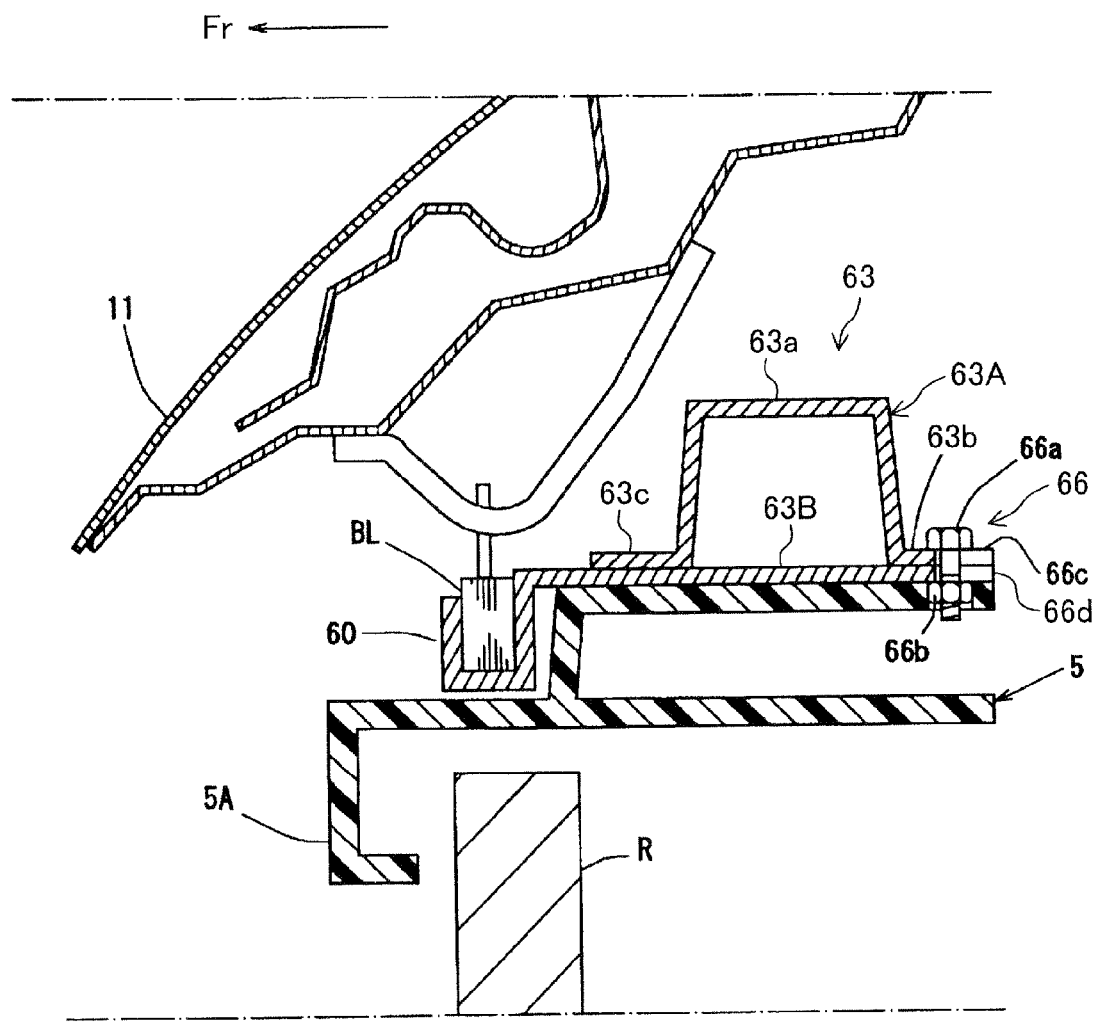
FIG. 5 is a sectional view showing a fixing structure of a shroud panel to a center member of a panel support member at the central part in the car width direction of the center member in the front end structure.
Figure 6:
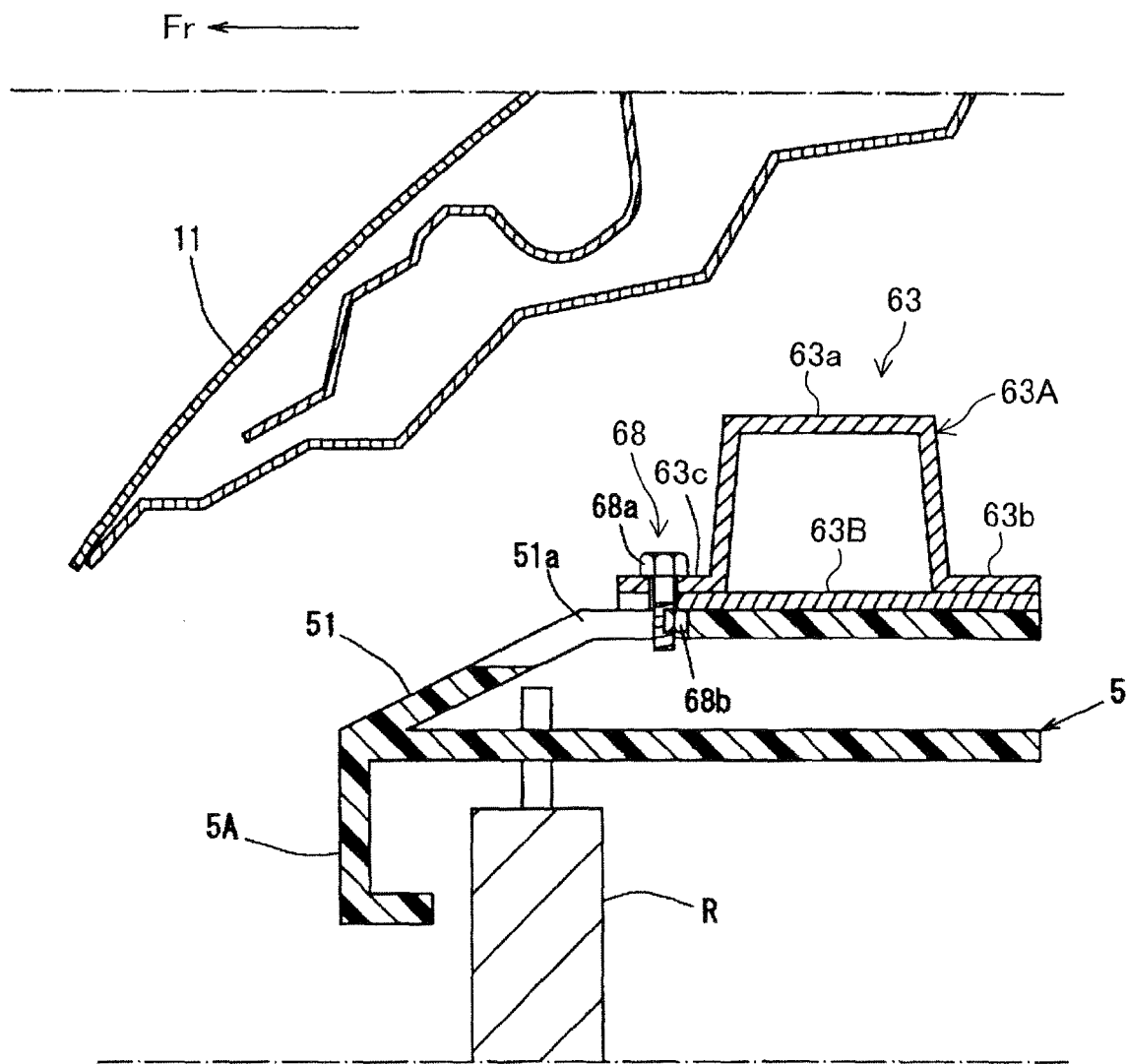
FIG. 6 is a sectional view showing a fixing structure of the shroud panel to the center member at the right and left side parts of the panel support member in the front end structure.

FIG. 1 is a front view of an automobile employing a front end structure in accordance with Embodiment 1 of the present invention, FIG. 2 is a perspective view of a front end part of the automobile, FIG. 3 is a sectional view taken along the line III-III in FIG. 1, FIG. 4 is a sectional view taken along the line IV-IV in FIG. 1, FIG. 5 is a sectional view showing a joint structure of a shroud panel 5 and a panel support member 6 at the central part in the car width direction of the panel support member 6, and FIG. 6 is a sectional view showing the joint structure of the shroud panel 5 and the panel support member 6 at the right and left side parts of the panel support member 6.

Hereinafter, the front, the rear, the right, and the left of the automobile are referred to as mere the front, the rear, the right, and the left, respectively. In addition, the front side of the automobile is denoted by Fr in the drawings.

The automobile includes at the front end thereof a front bumper 1 extending in the car wise direction. Inside the front bumper 1, a bumper beam 2 extending in the car width direction is provided. This bumper beam 2 is formed by bending a member in a substantially C shape in section opened to the rear so as to be recessed rearward at the central part in the vertical direction thereof for securing the rigidity thereof in the longitudinal direction of the automobile. The bumper beam 2 receives a load at head-on collision (including offset collision) of the automobile.

Behind the right and left side end parts of the bumper beam 2, right and left front side frames 3, 3 are provided respectively to extend in the longitudinal direction of the automobile. The right and left front side frames 3, 3 are arranged along the sides in the longitudinal direction of the automobile in an engine compartment ER, as shown in FIG. 2, and FIG. 4, and are in a rectangular shape with a closed section extending in the longitudinal direction of the automobile. The side end parts of the bumper beam 2 are fixed to the front end parts of the right and left front side frames 3, 3 through crush boxes 9, 9 (see FIG. 2, FIG. 3, and FIG. 4). When an impact load works on the front side frames 3, 3 from the bumper beam 2 through the crash boxes 9, 9, the impact load is distributed and transmitted to a vehicle frame (not shown) below the cabin, thereby forming a generally-called under load path of the impact load.

In the right and left end side parts of the automobile, right and left apron rein members 4, 4 are provided respectively to extend in the longitudinal direction of the automobile. The right and left apron rein members 4, 4 are provided at the right and left side ends in the upper part of the engine compartment ER, respectively, and are formed in a rectangular shape with a closed section extending in the longitudinal direction of the automobile. The apron rein members 4, 4 include front end parts 4a, 4a to which a panel support member 6 is fixed, which will be described later, and the rear end parts (not shown) fixed to the base end (not shown) of the front pillar at the front part of the cabin. The panel support member 6 is fixed to the front side frames 3, 3, as will be described later, so that an impact load working on the front side frames 3, 3 works on the apron rein members 4, 4 through the panel support member 6 to be distributed and transmitted to the roof panel (not shown) above the cabin from the apron rein members 4, 4, thereby forming a generally-called upper load path of the impact load.

Behind the bumper beam 2, the shroud panel 5 is provided which expands in the vertical direction and the car width direction to form a front end wall of the engine compartment ER. The panel support member 6 for supporting the shroud panel 5 is provided above the shroud panel 5.

In FIG. 1, reference numeral 7 denotes a head lamp, and 12 denotes a power train composed of an engine E and a transmission M.

The shroud panel 5 is a rectangular frame member composed of an upper part 51 extending in the car width direction, right and left two side parts 52, 52 extending in the vertical direction, and a lower part 53 extending in the car width direction below the upper part 51, as shown in FIG. 1 and FIG. 2. The right and left side parts 52, 52 respectively connect the right and left end parts of the upper part 51 and the lower part 53. The shroud panel 5 is made of resin as a whole and is lighter than a metal-made shroud panel.

The shroud panel 5 supports inside its frame member a radiator R as a heat exchanger and forms a unit in which the radiator R is incorporated in advance, as shown in FIG. 2. Unitization of the shroud panel 5 and the radiator R facilitates the assembly. In detail, only mounting of the shroud panel 5 from above of the automobile (a car body) in the main line of an automobile assembly line results in mounting of the radiator R, thereby facilitating the assembling operation of the vehicle front end part.

The panel support member 6 includes, as shown in FIG. 2, right and left side members 61, 61 respectively extending in the longitudinal direction of the automobile behind the right and left head lamps 7, 7, right and left vertical members 62, 62 respectively connecting the right and left side members 61, 61 and the right and left front side frames 3, 3, and a center member 63 extending in the car width direction to connect the right and left side members 61, 61. Each side member 61 includes a rear end part 61a welded and fixed to the front end part 4a of the corresponding apron rein member 4 and a front end part 61b located above the front end part of the corresponding front side frame 3. Each vertical member 62 has an upper end part welded and fixed to the front end part 61b of the corresponding side member 61 and a lower end part welded and fixed to the front end part of the corresponding front side frame 3.

In front of the central part in the car width direction of the center member 63, a pocket part 60 is formed for accommodating a bonnet locking mechanism BL (see FIG. 5) locking the bonnet 11. The pocket part 60 is in a substantially rectangular box shape of which upper part is opened.

Each side member 61 is in a substantially rectangular shape in section. As shown in FIG. 2, each side member 61 tilts so that the front end part 61b thereof is located slightly more inboard than the rear end part 61a thereof.

The upper faces at the front end parts 61b of the right and left side members 61, 61, form placement parts 64 for placing and fixing the corresponding end parts of the center member 63.

Each vertical member 62 is formed in a substantially rectangular shape in section extending in the vertical direction below the corresponding placement part 64. The vertical members 62 connect the corresponding placement parts 64, 64 of the side members 61, 61 and the corresponding front side frames 3, 3. Provision of the vertical members 62, 62 increases the supporting rigidity of the placement parts 64, 64 of the side members 61, 61.

Each vertical member 62 also connects the corresponding front side frame 3 and the panel support member 6 to allow an impact load working on the front side frames 3, 3 to be distributed and transmitted to the apron rein members 4, 4 through the panel support member 6.

The center member 63 linearly extends in the car width direction above the shroud panel 5 and is formed in a closed section by two members 63A, 63B. The member 63A has a section along the longitudinal direction of the automobile which includes a main body 63a in a substantially reverse U shape and front and rear flanges 63c, 63b formed at the ends of the main body 63a in the longitudinal direction of the automobile. The member 63B is a flat plate member.

The right and left side end parts of the center member 63 are placed on the placement parts 64, 64 of the right and left side members 61, 61, respectively, and are detachably fastened and fixed to the placement parts 64, 64 by means of fastener 65, 65, such as fastening bolt/nut pairs.

The center member 63 is fastened and fixed to the upper face of the upper part 51 of the shroud panel 5 at three points thereof, namely, the center thereof in the car width direction and the right and left side ends thereof, so that the panel support member 6 serves as a panel support part of the present invention supporting the shroud panel 5 against the apron rein members 4, 4 as car body members.

Further, the center member 63 is capable of being provisionally fixed to the upper face of the upper part 51 of the shroud panel 5 before being mounted to the automobile, as shown in FIG. 2, so as to be mounted in advance to the upper part to the shroud panel 5 as a unit. Mounting in advance of the center member 63 to the shroud panel 5 eliminates the need for separate mounting of the shroud panel 5 and the center member 63 in the main line of the automobile assembly line, thereby simplifying the assembling operation of the vehicle front end part.

The specific joint structure of the center member 63 to the shroud panel 5 will be described here with reference to FIG. 5 and FIG. 6.

As shown in FIG. 5, the rear flange 63b of the member 63A of the center member 63 is fastened and fixed to the upper part 51 of the shroud panel 5 by means of a center joint bolt 66a and a center joint nut 66b at the center in the car width direction of the center member 63. The center joint bolt 66a extends in the vertical direction while the center joint nut 66b is buried in and fixed to the upper part 51 of the shroud panel 5 to be in screw engagement with the center joint bolt 66a. Thus, a joint part 66 is formed at the center in the car width direction of the center member 63.

At the joint part of the rear flange 63b (a part corresponding to the joint part 66) where the center joint bolt 66a and the center joint nut 66b are in screw engagement with each other, a center notch 66c is formed which is opened to the rear and through which the center joint bolt 66a is inserted. As well, a center notch 66d similar to the center notch 66c is formed at a part of the member 63B correspondingly to the center notch 66c. The joint force of the center joint bolt 66a is set so that when an impact load works on the shroud panel 5 from the front, the center joint bolt 66a and the center joint nut 66b move rearward together with the shroud panel 5 relative to the center member 63 to fall off from the center notches 66c, 66d. Namely, the fastening and fixing of the center member 63 at the joint part 66 is released upon head-on collision of the automobile.

The aforementioned pocket part 60 is integrally formed with the center member 63. This integral formation of the pocket part 60 secures the bonnet locking mechanism BL at the center member 63 even if the shroud panel 5 retreats to release the fastening of the center member 63 to the shroud panel 5 upon head-on collision of the automobile.

On the other hand, as shown in FIG. 6, the front flange 63c of the member 63A of the center member 63 is fastened and fixed to the upper part 51 of the shroud upper panel 5 by means of side joint bolts 68a extending in the vertical direction and side joint nuts 68b in screw engagement with the side joint bolts 68a at the right and left end side parts of the center member 63. The side joint nuts 68b are generally-called half nuts and maintain their fastening state by being screwed at the rear part thereof by the side joint bolts 68a. Accordingly, the joint parts 68, 68 are formed at the right and left side end parts of the center member 63

Side notches 51a which are opened to the front and through which the side joint bolts 68a are inserted are formed in joint parts of the upper part 51 of the shroud panel 5 (parts corresponding to the joint parts 68, 68) where the side joint bolts 68a and the side joint nuts 68b are in screw engagement with each other. The side joint nuts 68b are fixed at the rear end parts of the side notches 51a. As well, through holes through which the side joint bolts 68a are inserted are formed in the joint parts of the front flange 63c while notches (or through holes) opened to the front are formed at parts of the member 63B which correspond to the through holes.

When an impact load works on the shroud panel 5 from the front, the shroud panel 5 and the side joint nuts 68b move rearward relative to the side joint bolts 68a and the center member 63, thereby allowing the side joint bolts 68*a* to move frontward relative to the shroud panel 5 to fall off from the side notches 51*a*. This releases the fastening and fixing of the center member 63 to the shroud panel 5 at the joint parts 68, 68 upon head-on collision of the automobile.

When the fastening and fixing of the center member 63 at the joint parts 66, 68, 68 is released, the shroud panel 5 and the radiator R move rearward relative to the center member 63. In this way, when an impact load works on the shroud panel 5 from the front, the shroud panel 5 and the radiator R are allowed to move rearward relative to the center member 63. In this structure, the joint parts 66, 68, 68 serve as a rearward movement allowing part in the present invention.

As shown in FIG. 5 and FIG. 6, a front end part 5A of the shroud panel 5 is located ahead of the center member 63. Because, a part supporting the radiator R is set ahead of the engine compartment ER so as not to invite interference of the shroud panel 5 with the power train 12. Further, as will be described later, this structure allows the shroud panel 5 to receive an impact load from the front more readily than the center member 63.

Further, as shown in FIG. 4, right and left joint brackets 10, 10 extending in the longitudinal direction of the automobile are provided between the side parts 52, 52 of the shroud panel 5 and the bumper beam 2 for more stably supporting the shroud panel 5. A front end flange 10*a* of each joint bracket 10 is fixed to the rear face of the bumper beam 2 while a rear end flange 10*b* of each joint bracket 10 is fixed to the corresponding side part 52 of the shroud panel 5. Accordingly, the side parts 52, 52 of the shroud panel 5 are fixed to the bumper beam 2 through the joint brackets 10, 10.

When the front bumper 1 (the bumper beam 2) receives an impact load from the front, the impact load is transmitted to the shroud panel 5 through the joint brackets 10, 10. The joint brackets 10, 10 secure the space in the longitudinal direction of the automobile between the bumper beam 2 and the shroud panel 5 at head-on collision of the automobile to invite no interference of the bumper beam 2 with the shroud panel 5. In addition, the shroud panel 5 is supported by the bumper beam 2 even after collision to prevent the shroud panel 5 from wholly falling off from the automobile.

Behavior of the automobile having the above described front end structure at head-on collision will be described next with reference to FIG. 7A and FIG. 7B.

Figure 7A:
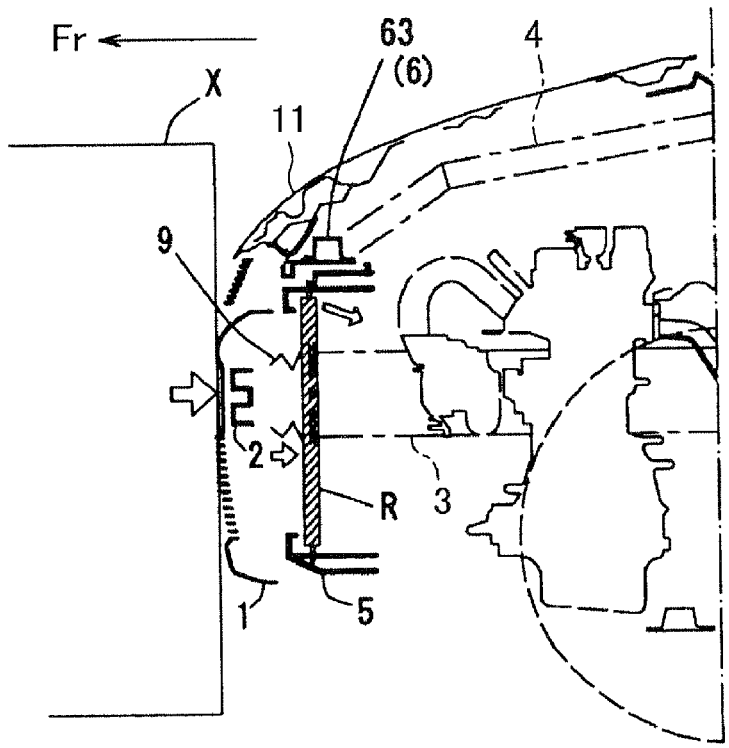
FIG. 7A is a side view of the front end part of the automobile which shows behavior of the automobile at light collision.

In a case of light collision, as shown in FIG. 7A, a colliding object X collides with the front end part of the automobile to make a rearward impact load to work on the front bumper 1 (the bumper beam 2). The bumper beam 2 is supported by the crush boxes 9, 9, and therefore, the crush boxes 9, 9 are buckled and deformed first at the collision to absorb impact energy. The, the buckling and deformation of each crash box 9 causes the bumper beam 2 to retreat.

Upon retreat of the bumper beam 2, the rearward impact load works also on the shroud panel 5 fastened and fixed by means of the joint brackets 10, 10 (see FIG. 4) to cause behavior of rearward movement. Particularly, the arrangement of the shroud panel 5 before the center member 63 causes behavior of the rearward movement of the shroud panel 5 even at light collision. Since the joint structure of the center member 63 to the shroud panel 5 is releasable by rearward movement of the shroud panel 5, the should panel 5 moves rearward relative to the center member 63 with the center member 63 not moved, thereby causing the shroud member 5 to separate from the center member 63.

In addition, as shown in FIG. 3, the shroud panel 5 (especially, the front end part 5A thereof) is overlapped with the crash boxes 9 when viewed from a side of the automobile. Accordingly, even upon light collision, upon which only the crash boxes 9, 9 are buckled and deformed with the front side frames 3, 3 not buckled and deformed, the impact load causing rearward movement of the shroud panel 5 works definitely to cause the shroud panel 5 to retreat and separate from the center member 63

In this way, in the case of light collision, the shroud panel 5 retreats and the radiator R retreats together with the shroud panel S to invite no interference of the radiator R with the bumper beam 2 to cause no breakage of the radiator R. The rearward movement of the shroud panel 5 is caused without inviting brakeage and the like of itself and therefore involves no breakage of itself.

Even if a part of the shroud panel 5 is broken or so, the panel support member 6 including the center member 63 is no broken at all. Accordingly, light collision necessitates replacement of only a low-cost component, such as the front bumper 1, the bumper beam 2, the shroud panel 5, the crash boxes 9, 9, or the like for repairing the front end part of the automobile.

On the other hand, in a case of heavy collision, a further large impact load works on the front bumper 1 (the bumper beam 2). At heavy collision, the crash boxes 9, 9 are buckled and deformed to absorb the impact energy, of course, while the impact load is transmitted also to the front side frames 3, 3. Thus, the impact load is distributed to the lower part of the car body through the aforementioned under load path.

At heavy collision, the impact load transmitted to the front side frames 3, 3 is also transmitted to the apron rein members 4, 4 through the panel support member 6, thereby attaining appropriate distribution of the impact load to increase the safety performance at collision.

Figure 7B:
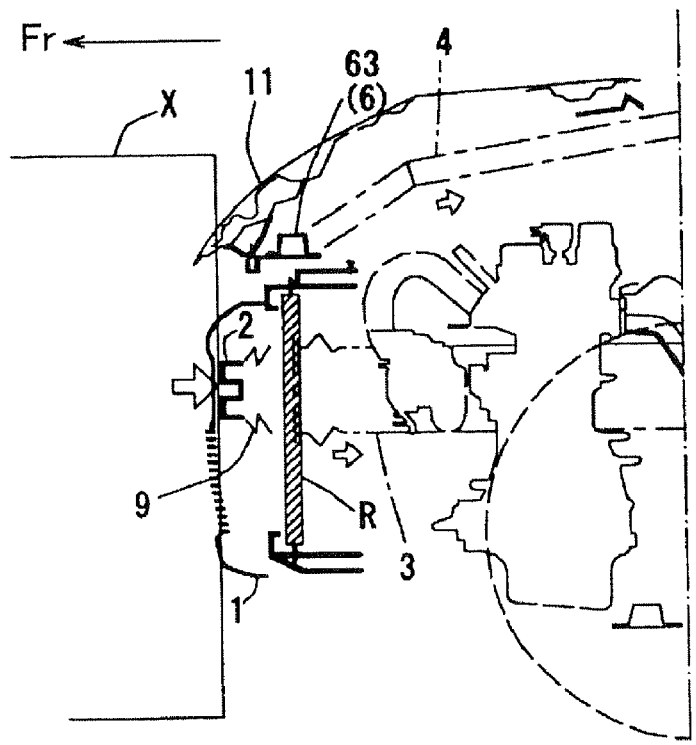
FIG. 7B is a side view of the front end part of the automobile which shows behavior of the automobile at heavy collision.

As shown in FIG. 7B, when deformation to an extent that the bonnet 11 is bent or so is caused at heavy collision to cause behavior that the bonnet 11 leaps upward. The bonnet locking mechanism BL fixed firmly to the pocket part 60 provided in the center member 63 suppresses the behavior of the bonnet 11.

Effects in the thus structured present embodiment will be described next.

In the present embodiment, the joint parts 66, 68, 68 are formed for allowing the shroud panel 5 and the radiator R to move rearward relative to the center member 63 of the panel support member 6 when an impact load works on the shroud panel 5 from the front. Specifically, the joint parts 66, 68, 68 fix the upper part 51 of the shroud panel 5 to the center member 63 and allows, when an impact load works on the shroud panel 5 from the front, the upper part 51 to separate from the center member 63 to allow the shroud panel 5 and the radiator R to move rearward relative to the center member 63.

Each structure of the joint parts 66, 68, 68 allows the shroud panel 5, which is fixed by means of the center joint bolt 66*a*, the center joint nut 66*b*, the side joint bolts 68*a*, and the side joint nuts 68*b*, to separate from the center member 63 and retreats rearward upon light collision. Accordingly, interference of the bumper beam 2 with the shroud panel 5 and the radiator R can be prevented even if the front bumper 1 (the bumper beam 2) retreats, thereby preventing the radiator R and the shroud panel 5 from being broken.

Upon heavy collision, the impact load works also on the panel support member 6 to be distributed and transmitted to the apron rein members 4, 4 therebehind through the panel support member 6.

Hence, in the front end structure of the automobile including the resin-made shroud panel 5 supporting the radiator R, the impact load distribution performance at heavy collision can be enhanced while the repair cost can be reduced by preventing the radiator R and the shroud panel 5 from being broken at light collision as far as possible.

According to the present embodiment, in the case where the radiators R supported by the shroud panel 5 have almost the same size, the shroud panel 5 can be used in common to automobiles different in outer contours from each other, which means that only change of the panel support member 6 suffices according to the outer contours.

The shroud panel 5 supports only the radiator R in the present embodiment, but the present invention is not limited thereto. The shroud panel 5 may be one supporting a condenser of an air conditioner, an intercooler of a supercharger for the engine E, or the like (the same is applied to Embodiments 2 to 6 as will be described later).

The panel support member 6 in the present embodiment includes the side members 61, 61, the vertical members 62, 62, and the center member 63 detachably fastened and fixed to the side members 61, 61.

This enables attachment and detachment of only the center member 63 out of the components of the panel support member 6. Accordingly, the shroud panel 5 can be mounted from above of the automobile with the center member 63 taken off therefrom. Hence, the degree of freedom of the automobile assembling operation can be increased even though the panel support member 6 is arranged above the shroud panel 5.

The whole panel support member 6 may be fastened and fixed detachably to the front end parts 4a, 4a of the apron rein members 4, 4, rather than detachable fastening of only the center member 63 of the panel support member 6.

In the present embodiment, the center member 63 is fixed provisionally on the upper face of the upper part 51 of the shroud panel 5 before being mounted to the automobile.

Accordingly, the center member 63 can be mounted from above of the automobile (the car body) as a unit together with the shroud panel 5. This eliminates the need for separate mounting for the shroud panel 5 and the center member 63 in the main line of the automobile assembly line, thereby reducing the operation man hour to shorten the time required for assembling.

Further, the side parts 52, 52 of the shroud panel 5 are fixed to the bumper beam 2 by means of the joint brackets 10, 10.

This allows the shroud panel 5 to retreat together with the front bumper 1 upon head-on collision of the automobile. Accordingly, no interference of the radiator R supported by the shroud panel 5 with the bumper beam 2 is involved to prevent definitely the radiator R from being broken, thereby contemplating reduction in repair cost.

In the present embodiment, the upper part 51 of the shroud panel 5 is fastened and fixed to the flanges 63c, 63b of the member 63A of the center member 63. For this fastening and fixing, the center notch 66c is formed in the rear flange 63b while the through holes are formed in the front flange 63c. Formation of the center notch 66c and the through holes involves less or no influence of rigidity lowering on the center member 63, thereby involving no lowering of the rigidity of the center member 63. Hence, the shroud panel 5 can be fastened and fixed to the center member 63 without inviting lowering of the load transmission performance of the center member 63 (the panel support member 6) at heavy collision.

In the present embodiment, the center notch 63c opened to the rear and the side notches 51a opened to the front are formed in the rear flange 63b and the upper part 51 of the shroud panel 5, respectively. This simple structure facilitates separation of the shroud panel 5 from the center member 63.

In the present embodiment, the pocket part 60 is formed in the center member 63 for accommodating the bonnet locking mechanism BL to prevent the bonnet locking mechanism BL from retreating even when the shroud panel 5 separates from the center member 63 and retreats at light collision. Hence, the radiator R can be prevented from being broken at light collision while the bonnet supporting rigidity of the bonnet locking mechanism BL can be increased.

Figure 8:
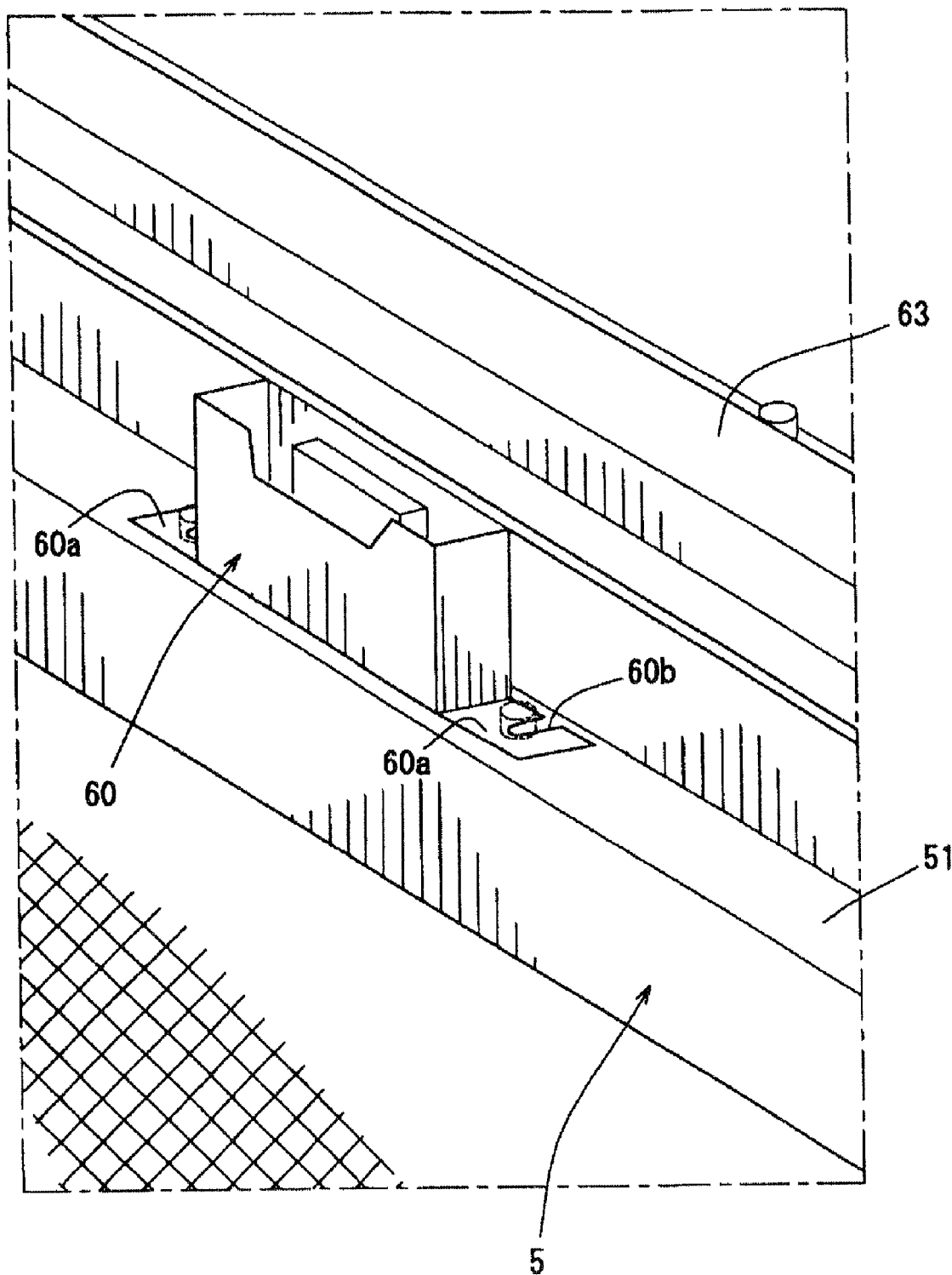
FIG. 8 is a perspective view of a main part of the front end part of the automobile which shows another embodiment of a pocket part accommodating a bonnet locking mechanism.

As shown in FIG. 8, fixing flanges 60a, 60a may be provided at lower side parts of the pocket part 60 provided at the center member 63 so that the pocket part 60 is fastened and fixed to the upper part 51 of the shroud panel 5 through the fixed flanges 60a, 60a. In so doing, it is preferable to form a notch 60b opened to the rear in each fixing flange 60a for releasing the fastening and fixing of the pocket part 60 to the upper part 51 when an impact load works on the shroud panel 5 from the front.

This structure increases the supporting rigidity of the pocket part 60, and the supporting rigidity of the bonnet locking mechanism BL is increased by using the shroud panel 5. Further, the fastening and fixing of the fixing flanges 60a, 60a to the shroud panel 5 is released upon head-on collision of the automobile to inhibit no retreat of the shroud panel 5. Hence, both enhancement of the supporting rigidity of the bonnet locking mechanism BL and promotion of retreat of the shroud panel 5 at head-on collision can be contemplated.

In addition, in the present embodiment, the shroud panel 5 is overlapped with the crash boxes 9, 9 when viewed from a side of the automobile.

This makes the shroud panel 5 to retreat definitely when the crash boxes 9, 9 are buckled and deformed upon light collision. Accordingly, retreat of the shroud panel 5 at light collision is further promoted. Hence, the radiator R is protected further securely.

Embodiment 2

Figure 9:
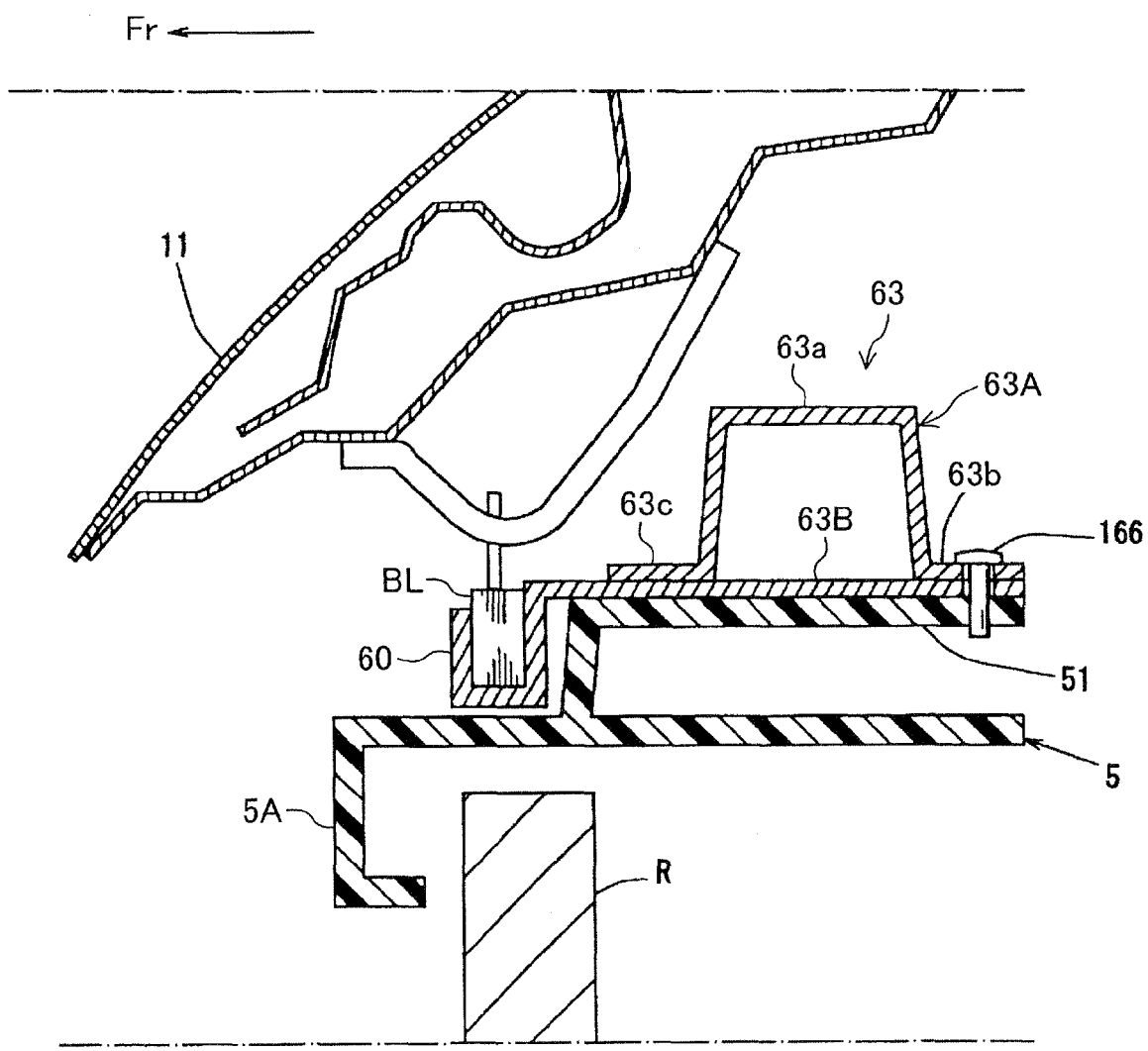
FIG. 9 is a view showing Embodiment 2 of the present invention and corresponding to FIG. 5.

FIG. 9 shows Embodiment 2 of the present invention, in which the fixing structure of the center member 63 of the panel support member 6 to the shroud panel 5 is different from that in Embodiment 1. The same reference numerals are assigned to the same components as in Embodiment 1 for omitting the description thereof (the same is applied to the following Embodiments 3 to 6).

In detail, in the present embodiment, a resin-made press-in pin 166 is pressed in the upper part 51 of the shroud panel 5 from above of the rear flange 63b of the member 63A of the center member 63 at the center in the car width direction of the center member 63 to press and fix the rear flange 63b to the upper part 51 of the shroud panel 5. In each of the rear flange 63b and the member 63B, a through hole is formed rather than the notch in Embodiment 1, through which the pressing pin 166 is inserted.

Additional press-in pins 166 press and fix the front flange 63c to the upper part 51 of the shroud panel 5 at the right and left side parts of the center member 63, similarly to that at the center in the car width direction.

Each press-in pin 166 is made of a resin material more fragile than that of the shroud panel 5 to an extent that the shroud panel 5 is broken upon receipt of a rearward impact load. Accordingly, the pressing and fixing state of the center member 63 to the shroud panel 5 can be released even upon light collision to allow the upper part 51 of the shroud panel 5 to separate from the center member 63.

Accordingly, the same effects as in Embodiment 1 can be obtained also in the present embodiment. The structure according to the present embodiment eliminates the need to form notches in the rear flange 63b and the upper part 51 of the shroud panel 5, thereby simplifying the processing of the center member 63 and the shroud panel 5.

Embodiment 3

Figure 10:
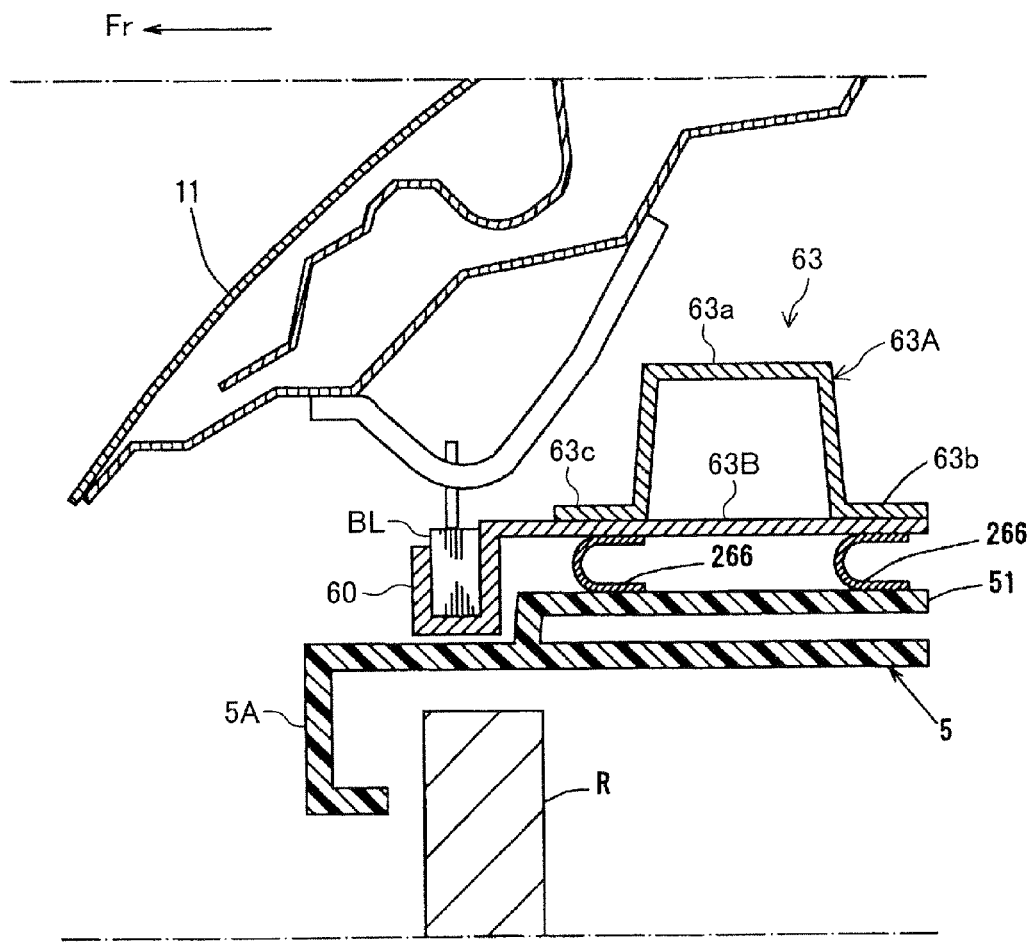
FIG. 10 is a view showing Embodiment 3 of the present invention and corresponding to FIG. 5.

FIG. 10 shows Embodiment 3 of the present invention, in which the fixing structure of the center member 63 of the panel support member 6 to the shroud panel 5 is different from those in Embodiments 1 and 2.

In detail, in the present embodiment, a plurality (two in FIG. 10) of resin-made to-be-broken members 266, 266 in a substantially U shape in section are interposed between the center member 63 and the upper part 51 of the shroud panel 5 to fix the center member 63 to the upper part 51 of the shroud panel 5. The upper faces of the to-be-broken members 266, 266 are fastened and fixed to the rear flange 63b or the front flange 63c with the member 63B interposed while the lower faces thereof are fastened and fixed to the upper part 51 of the shroud panel 5 (by means of bolts or the like not shown in FIG. 10). Fixing of the upper face and the lower face of each to-be-broken member 266 is not limited to fastening. Further, the number of and arrangement of the to-be-broken members 266 are set appropriately according to the strength of the to-be-broken members 266. For example, as the joint parts 66, 68, 68 in Embodiment 1, three to-be-broken members 266 are provided in total at the center in the car width direction and the right and left side parts of the center member 63.

The to-be-broken members 266 are made of a resin material more fragile than that of the shroud panel 5 to an extent that the shroud panel 5 is broken upon receipt of the rearward impact road at light collision, similarly to the press-in pins 166 in Embodiment 2. This allows fixing of the center member 63 to the shroud panel 5 to be released upon light collision, thereby separating the upper part 51 of the shroud panel 5 from the center member 63.

Accordingly, the same effects as those in Embodiment 1 can be obtained in the present embodiment. Particularly, with the structure according to the present embodiment, each to-be-broken member 266 is allowed to be broken to prevent definitely the shroud panel 5 from being broken, thereby eliminating the need for replacement of the shroud panel 5.

The fixing structure of the panel support member 6 to the shroud panel 5 is not limited to the fixing structures described in Embodiments 1 to 3 and may be a fixing structure by an engaging member or a bonding member.

Embodiment 4

FIG. 11 to FIG. 17 show Embodiment 4 of the present invention, in which the structure of the shroud panel 5 and the structure of the panel support part supporting the shroud panel 5 are different from those in Embodiments 1 to 3.

In detail, in the present embodiment, the shroud panel 5 is basically made of a resin material, in a part of which a metal-made rein member 54 (reinforcement) is insert-formed. The part where the metal-made rein member 54 is insert-formed serves as a reinforcing part 55 integrally formed with the shroud panel 5 to exhibit almost the same rigidity as that of a metal-made shroud panel. Namely, the reinforcing part 55 is a substitution of the panel support member 6 in Embodiments 1 to 3, as a panel support part of the present invention.

The upper part 51 of the shroud panel 5 includes right and left arms 51a, 51a at the right and left sides thereof respectively protruding and extending sideward and rearward and the center upper part 51b between the arms 51a, 51a.

The reinforcing part 55 includes the arms 51a, 51a, and the center upper part 51b of the upper part 51, the side parts 52, 52, and the lower part 53, wherein the reinforcing parts corresponding to the arms 51a, 51a, the center upper part 51b, the side parts 52, 52, and the lower part 53 are called arm reinforcing parts 55A, 55A, an upper reinforcing part 55B, side reinforcing parts 55C, 55C, and a lower reinforcing part 55D, respectively. The upper reinforcing part 55B, the side reinforcing parts 55C, 55C, and the lower reinforcing part 55D form a rectangular flame which is called a frame-like reinforcing part 55E as a unit of these reinforcing parts 55B, 55C, 55C, 55D.

Inside the frame-like reinforcing part 55E, a radiator support part 56 in a rectangular frame shape is provided which protrudes frontward from the frame-like reinforcing part 55E so that the front end thereof is located ahead of the front end of the frame-like reinforcing part 55E. The radiator support part 56 includes an upper frame part 56A extending in the car width direction, right and left side frame parts 56B, 56B extending in the vertical direction, and a lower frame part 56C extending in the car width direction. The side frame parts 56B, 56B connect the right side ends and the left side ends of the upper frame part 56A and the lower frame part 56C. The radiator support part 56 supports the radiator R through four support members 57 arranged at the right and left side parts of the upper frame part 56A and the lower frame part 56C.

Figure 14:
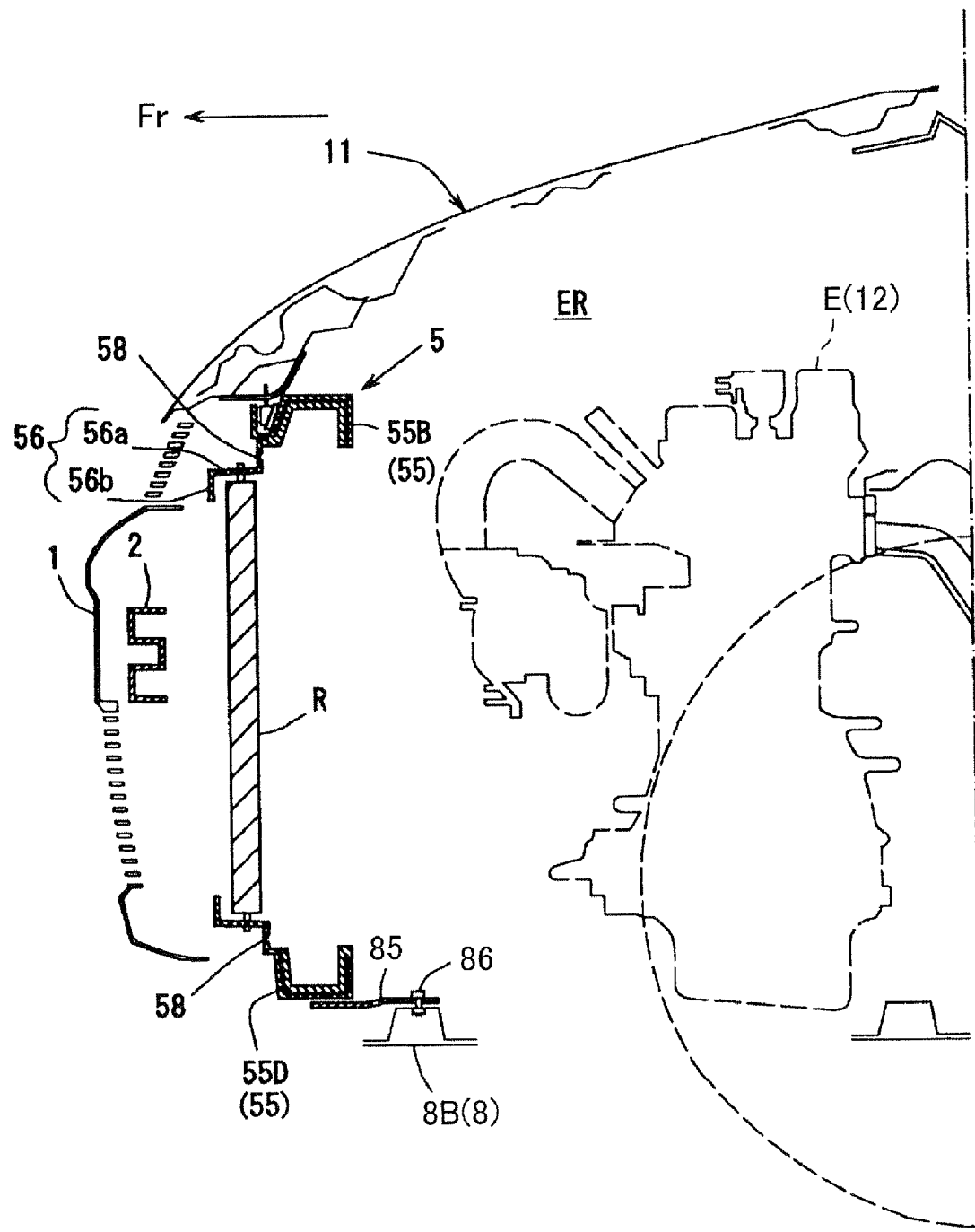
FIG. 14 is a sectional view taken along the line XIV-XIV in FIG. 13.
Figure 15:
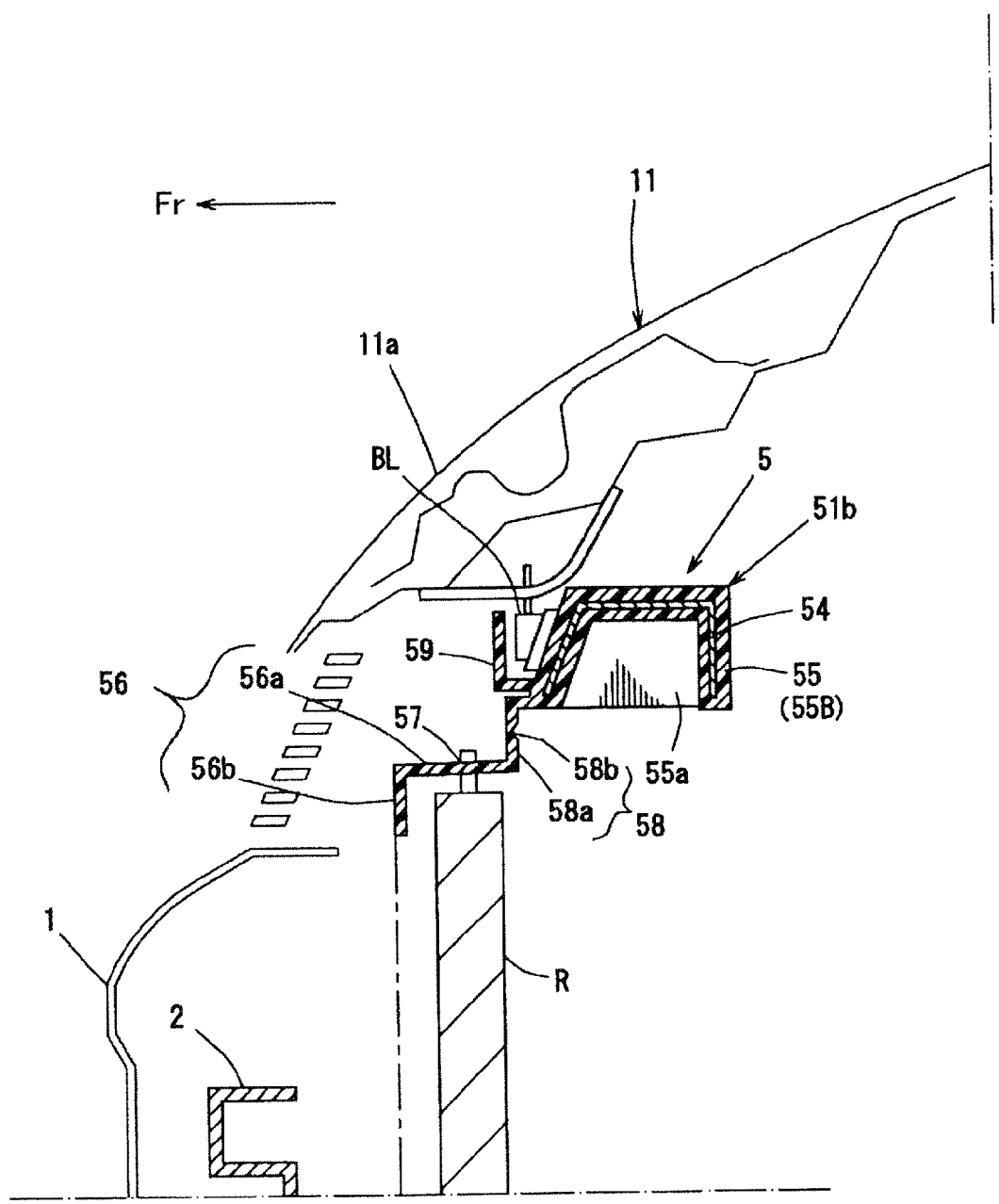
FIG. 15 is an enlarged sectional view of a main part in FIG. 14.
Figure 16:
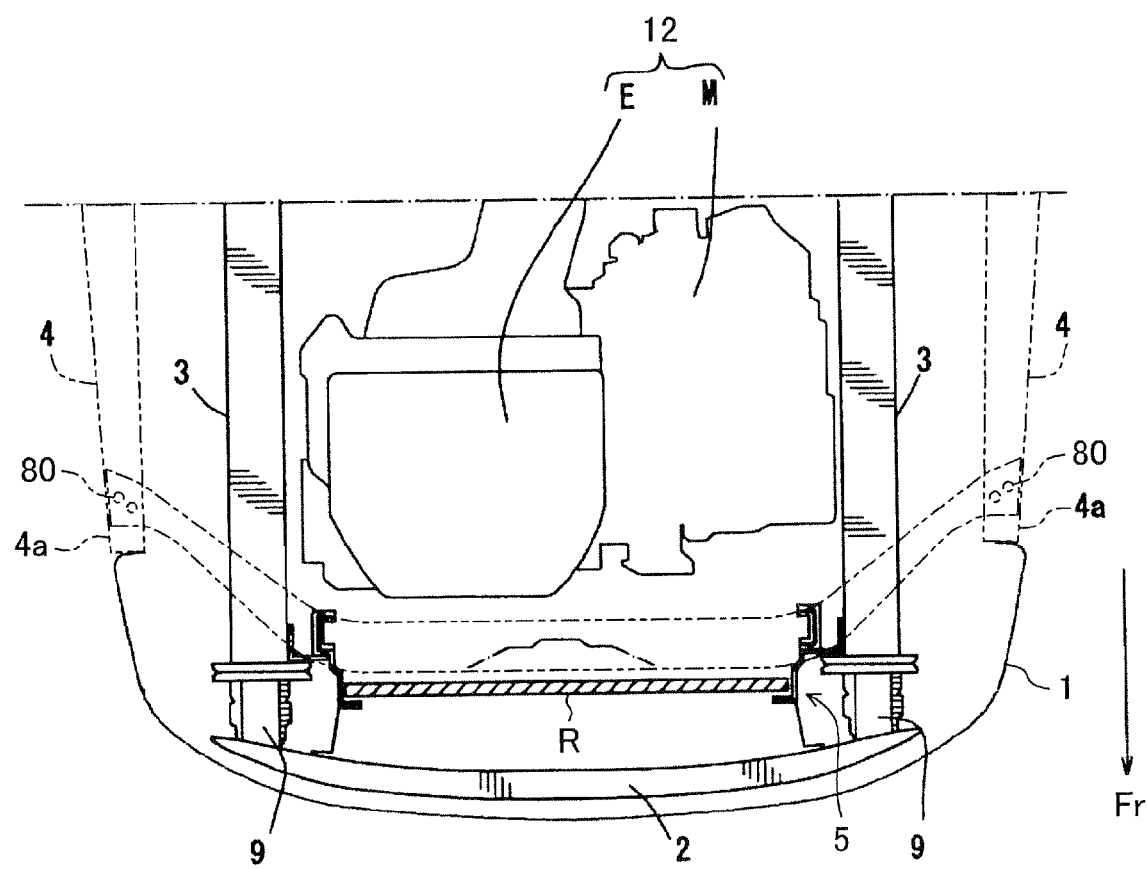
FIG. 16 is a sectional view taken along the line XVI-XVI in FIG. 11.

The radiator support part 56 includes, around the entire periphery thereof, a rise wall 56a protruding frontward from the frame-like reinforcing part 55E and a load receiving part 56b extending inward of the frame from the front end of the rise wall 56a, as shown in FIG. 14 and FIG. 15. The load receiving part 56b receives an impact load from the bumper beam 2.

Figure 12:
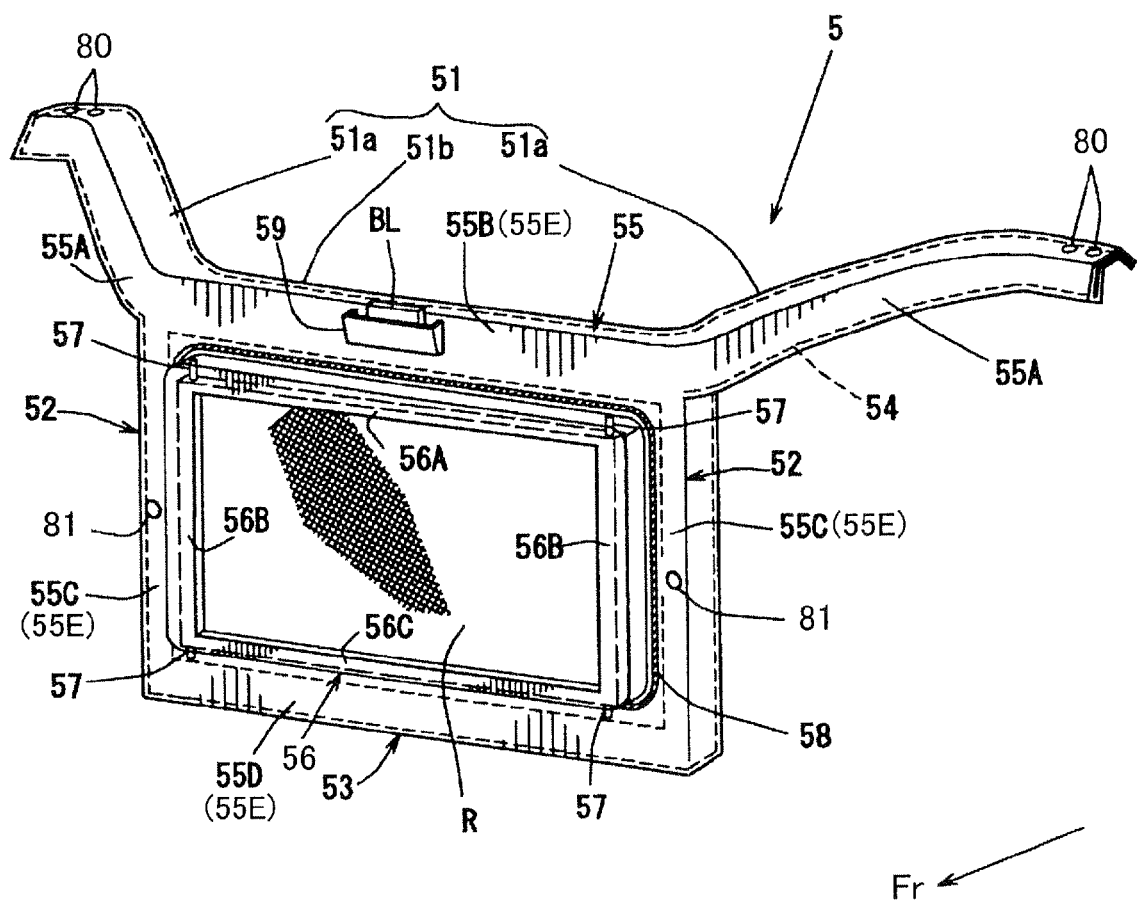
FIG. 12 is a perspective view of a front end part of an automobile in accordance with Embodiment 4 of the present invention.
Figure 13:
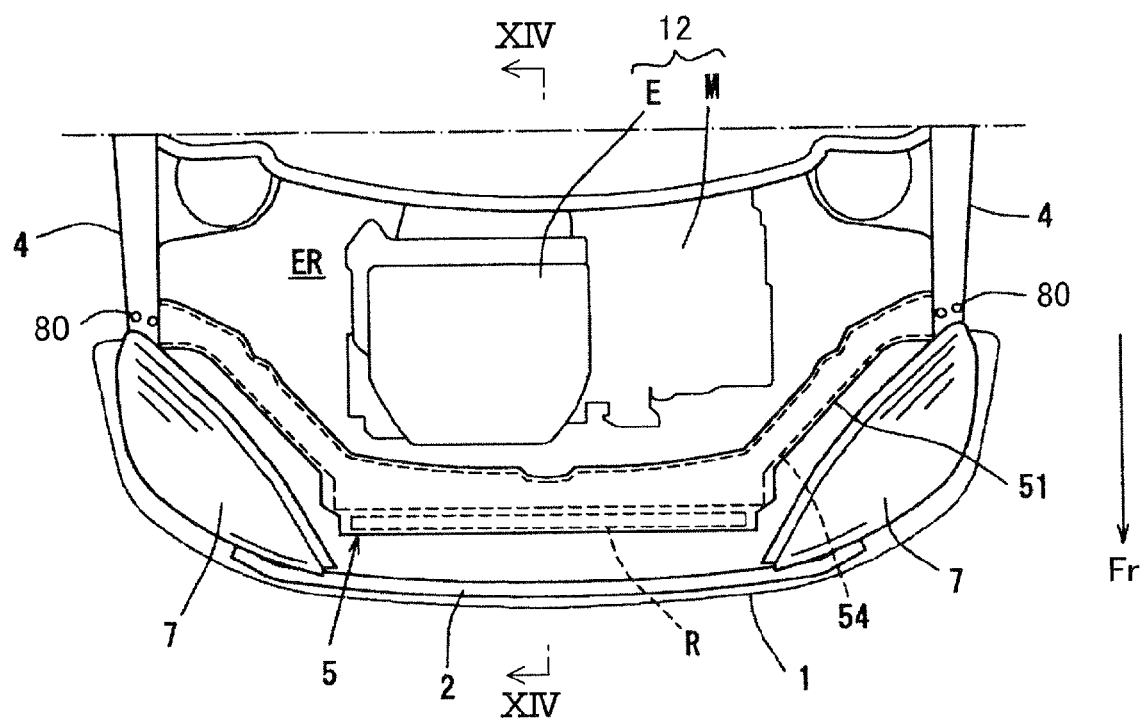
FIG. 13 is a plan view of the front end part of the automobile in accordance with Embodiment 4.
Figure 17:
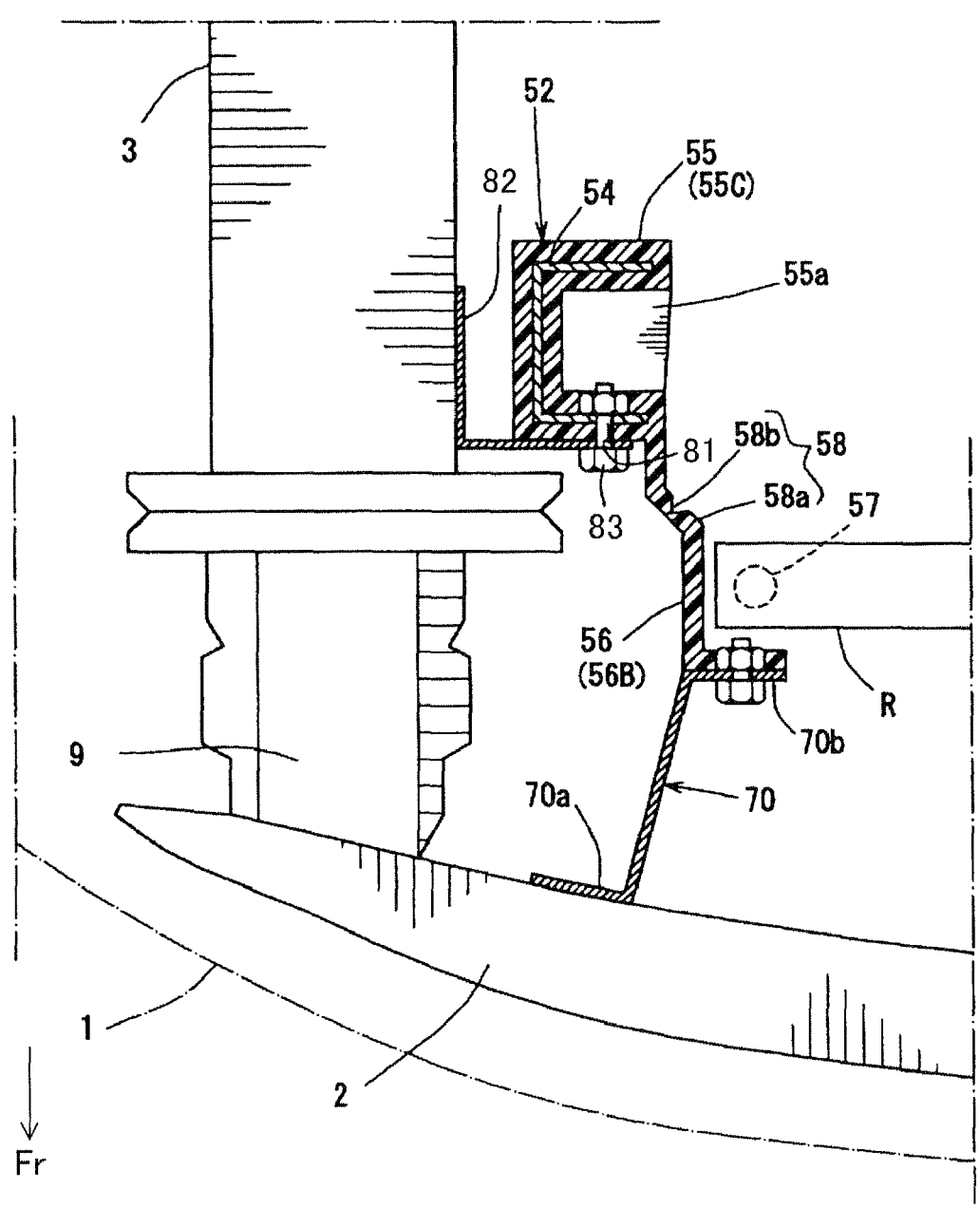
FIG. 17 is an enlarged sectional view of a main part in FIG. 16.

At the boundary part between the frame-like reinforcing part 55E and the radiator support part 56, a thin to-be-broken part 58 is formed to surround the entire periphery of the radiator support part 56, as shown in FIG. 12. The thin to-be-broken part 58 is composed of a joint wall part 58a which connects the frame-like reinforcing part 55E and the radiator support part 56 and in which a recess 58b in a V-shape in section is formed, as shown in FIG. 15 and FIG. 17, and is formed simultaneously with formation of the shroud panel 5. When an impact load larger than a predetermined value works on the radiator support part 56 from the front, the thin to-be-broken part 58 is broken from the recess 58b as a starting point. This breakage allows the radiator support part 56 to move rearward relative to the reinforcing part 55 and to separate from the reinforcing part 55. Namely, the thin to-be-broken part 58 forms a fragile part as the rearward movement allowing part in the present invention, and breakage thereof upon receipt of an impact load working on the radiator support part 56 of the shroud panel 5 from the front allows the radiator R and the radiator support part 56 to move rearward relative to the reinforcing part 55.

The metal-made rein member 54 inside the reinforcing part 55 is formed in a substantially C shape in section, as shown in FIG. 15 and FIG. 17, and has rigidity to an extent that it is not readily deformed even when a comparatively large load works thereon.

In the front face of the center upper part 51b of the shroud panel 5, a pocket part 59 is formed for accommodating the bonnet locking mechanism BL. The bonnet locking mechanism BL accommodated in the pocket part 59 is fixed to the upper reinforcing part 55B of the center upper part 51b, as shown in FIG. 15, and is fastened and fixed to the metal-made rein member 54 by means of a fixing bolt or the like (not shown).

Accordingly, even when an impact load works on the bonnet 11 to cause behavior that a front end part 11a of the bonnet 11 leaps upward, the bonnet locking mechanism BL does not separate from the center upper part 51b to keep firmly the front end part 11a of the bonnet 11 at the original position thereof.

As shown in FIG. 12, at the tip ends of the arm reinforcing parts 55A, 55A, apron fixing parts 80 are formed for fastening and fixing the corresponding arm reinforcing parts 55A, 55A to the corresponding front end parts 4a, 4a of the apron rein members 4, 4. With the apron fixing parts 80, 80, the unit of the shroud panel 5 in which the radiator R is incorporated in advance can be fastened and fixed easily to the apron rein members 4, 4 by mounting the unit from above of the automobile. In addition, with the apron fixing parts 80, 80, the reinforcing part 55 (the arm reinforcing parts 55A, 55A) of the shroud panel 5 can be fixed to the apron rein members 4, 4 firmly.

In the front faces of the side reinforcing parts 55C, 55C at the side parts 52, 52 of the shroud panel 5, bolt fixing holes 81, 81 are formed for fixing the shroud panel 5 to the front side frames 3, 3.

Specifically, as shown in FIG. 17, the base parts of mounting plates 82, 82 in a substantially L shape in section are bonded to the front side frames 3, 3, while the front end parts of the mounting plates 82, 82 are fastened and fixed to the side reinforcing parts 55C of the side parts 52, 52 by means of mounting bolts 83, 83 inserted in the bolt fixing holes 81, 81. Fastening and fixing of the mounting plates 82, 82 to the side reinforcing parts 55C, 55C attain firm fixing of the reinforcing part 55 of the shroud panel 5 to the front side frames 3, 3. This fastening and fixing are carried out after the unit of the shroud panel 5 is mounted.

Further, as shown in FIG. 17, load transmitting brackets 70, 70 are provided between the side frame parts 56B, 56B of the radiator support part 56 and the bumper beam 2. Each load transmitting bracket 70 includes a front flange 70a bonded and fixed to the rear face of the bumper beam 2 and a rear flange 70b fastened and fixed to the front face, namely, the load receiving face 56b of the corresponding side frame part 56B of the radiator support part 56.

Provision of the load transmitting brackets 70, 70 between the side frame parts 56B, 56B of the radiator support part 56 and the bumper beam 2 achieves transmission of an impact load working on the bumper beam 2 to the radiator support part 56. After collision, the load transmitting brackets 70, 70 still support the radiator support part 56 having separated from the reinforcing part 55.

Figure 11:
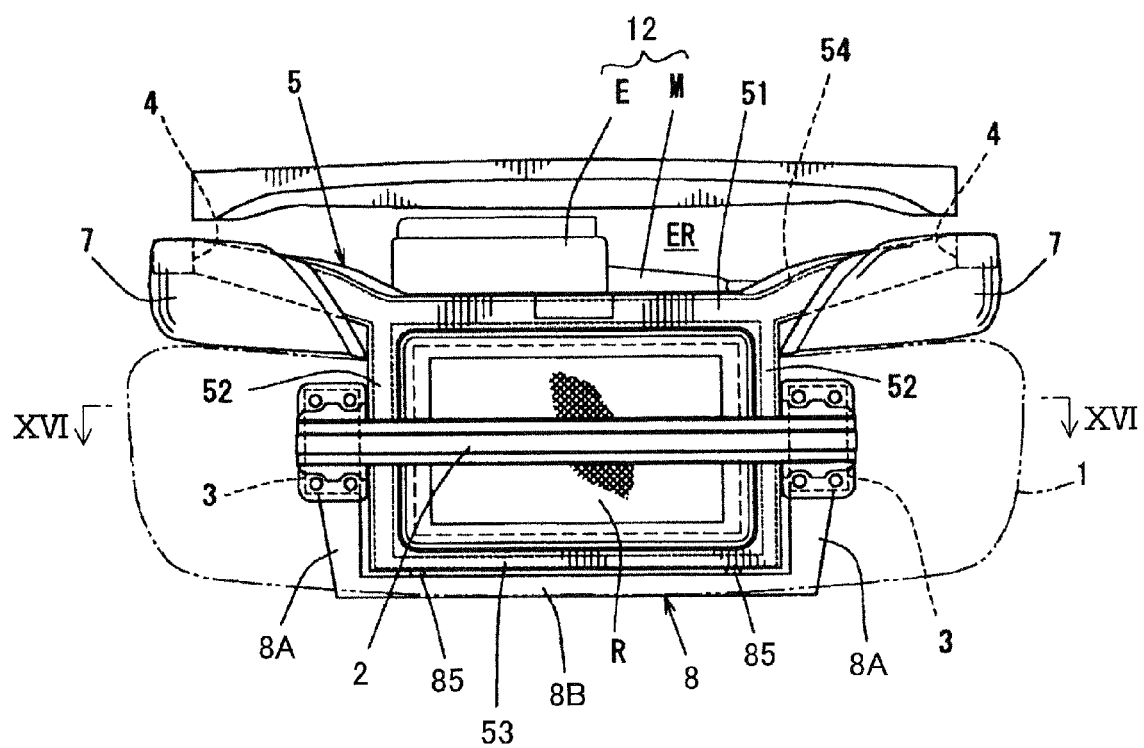
FIG. 11 is a view showing Embodiment 4 of the present invention and corresponding to FIG. 1.

As shown in FIG. 11, under the engine compartment ER, a perimeter frame 8 is provided which extends in the car width direction to connect the right and left front side frames 3, 3. The perimeter frame 8 includes vertical members 8A, 8A extending in the vertical direction and fastened and fixed at the upper end parts thereof to the front side frames 3, 3 and a transverse member 8B extending in the car width direction to connect the vertical members 8A, 8A.

The perimeter frame 8 pivotally supports at the vertical members 8A, 8A a suspension arm of a front suspension device (not shown) to function as a suspension cross member supporting the suspension device.

To the transverse member 8B of the perimeter frame 8, two joint plates 85, 85 are fixed which extend from the lower reinforcing part 55D of the lower part 53 of the shroud panel 5. Specifically, as shown in FIG. 14, each joint plate 85 bonded to the lower face of the lower reinforcing part 55D of the lower part 53 and the transverse member 8B of the perimeter frame 8 are fastened and fixed to each other by means of a fastener 86, such as a bolt/nut pair. Thus, the lower reinforcing part 55D of the lower part 53 is fastened and fixed to the perimeter frame 8 as the suspension cross member supporting the suspension device.

Figure 18A:
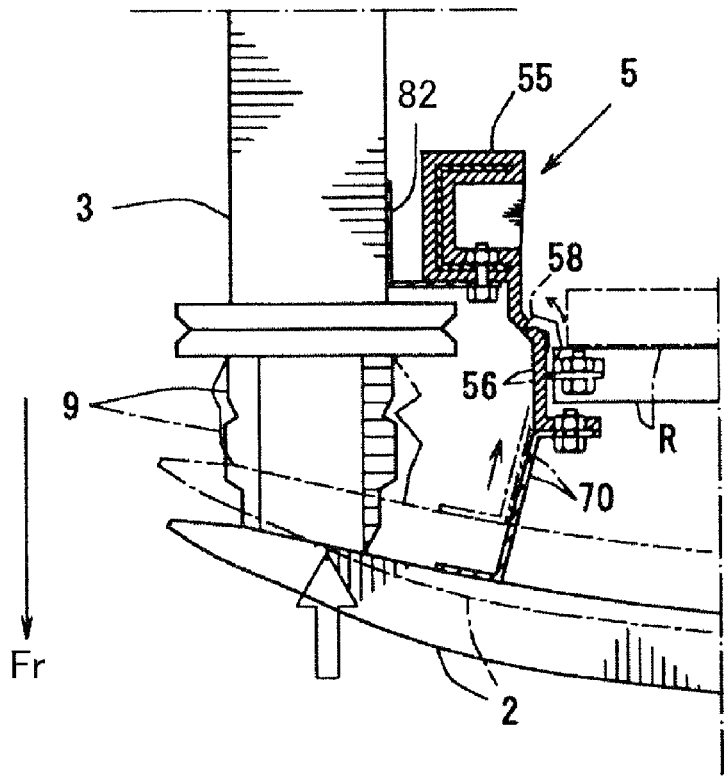
FIG. 18A is a view corresponding to FIG. 17 which shows deformation of a shroud panel when an impact load works on a radiator support part of the shroud panel in accordance with Embodiment 4.

Behavior that the vehicle front end part, especially, the shroud panel 5 is deformed upon head-on collision of the automobile will be described next with reference to FIG. 18A, FIG. 18B, FIG. 19A, FIG. 19B, FIG. 20A, and FIG. 20B As shown in FIG. 18A, when an impact load works on the bumper beam 2 from the front, the crash boxes 9, 9 provided at the front ends of the front side frames 3, 3 are buckled and deformed to absorb impact energy. Further, the impact load is transmitted to the radiator support part 56 of the shroud penal 5 through the load transmitting brackets 70, 70 fixed to the bumper beam 2.

Behavior of rearward movement is caused in the radiator support part 56 to which the impact load is transmitted. The behavior of rearward movement bends and breaks the thin to-be-broken part 58 over the entire periphery thereof, as shown in FIG. 18A and FIG. 8B. On the other hand, the reinforcing part 55, which is fixed to the front side frames 3, 3 through the mounting plates 82, 82, will not retreat by the impact load if it is light enough to an extent that the front side frames 3, 3 are not buckled and deformed (light collision). Accordingly, the radiator support part 56 and the radiator R shift rearward relative to the reinforcing part 55 without being restricted by the strong reinforcing part 55, thereby definitely causing breakage of the thin to-be-broken part 58.

Figure 18B:
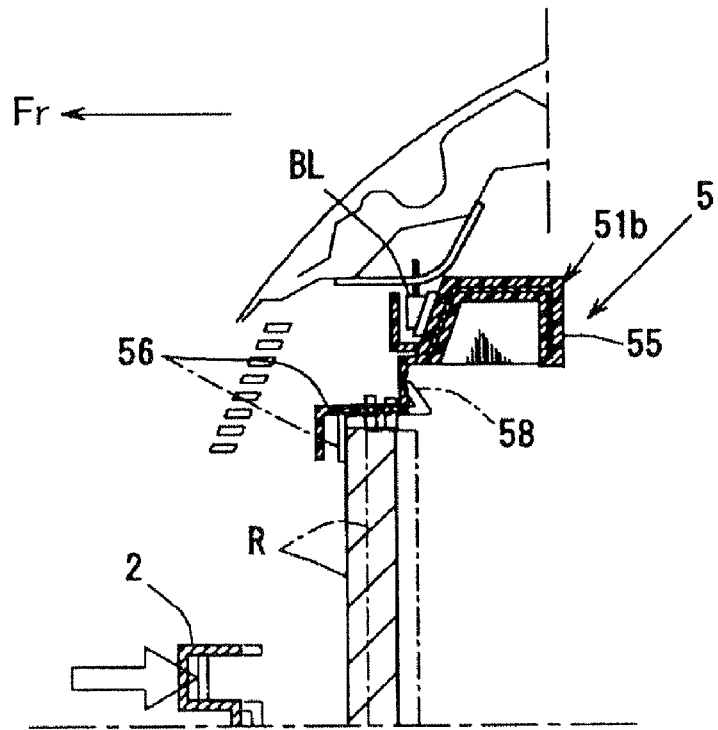
FIG. 18B is a view corresponding to FIG. 15 which shows deformation of the shroud panel when the impact load works thereon.

As shown in FIG. 18B, the bonnet locking mechanism BL, which is fixed to the upper reinforcing part 55B of the center upper part 51b, will never retreat as well even when the radiator support part 56 separates from the reinforcing part 55 upon head-on collision of the automobile.

Figure 19A:
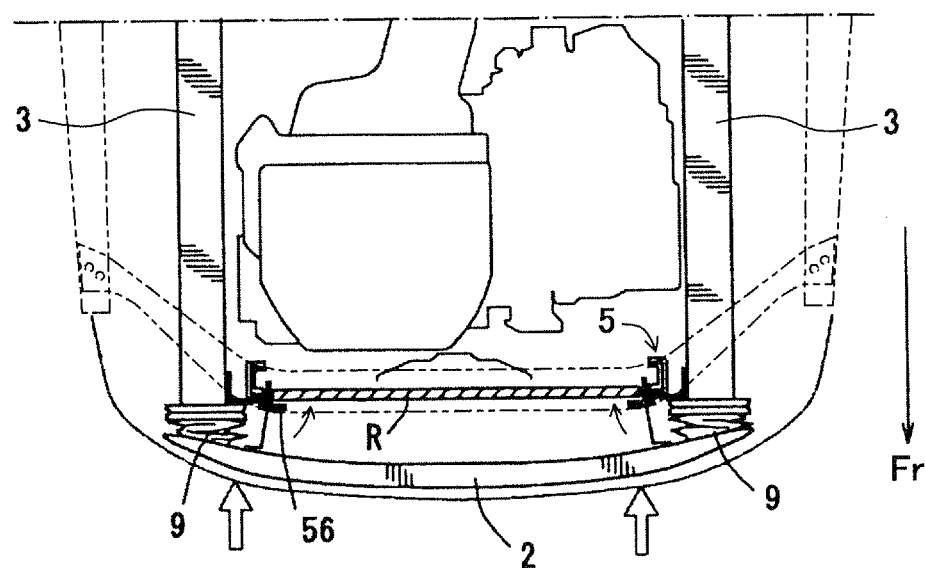
FIG. 19A is a view corresponding to FIG. 16 which shows behavior of the automobile at light collision in Embodiment 4.
Figure 20A:
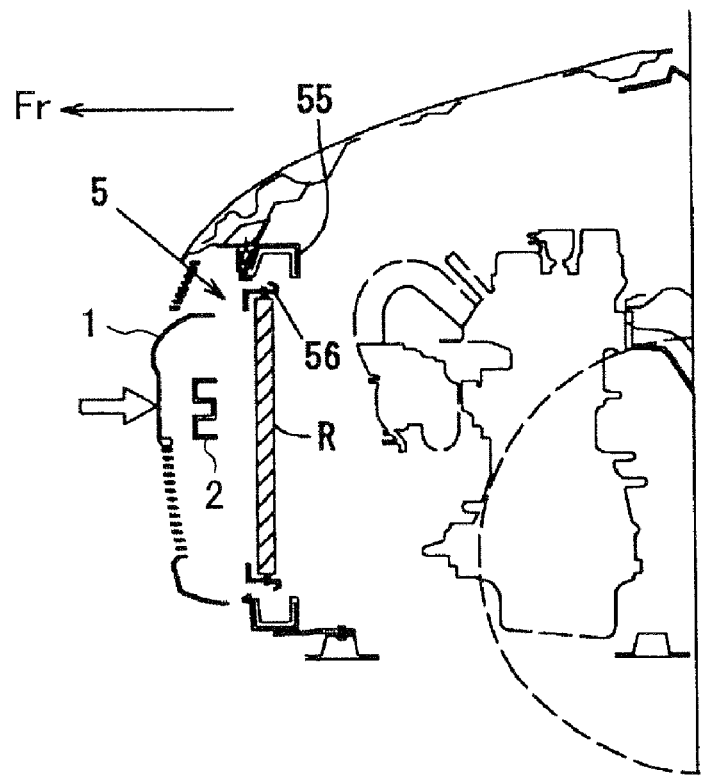
FIG. 20A is a side view of the front end part of the automobile which shows behavior of the automobile at light collision in Embodiment 4.

In a case of light collision, as shown in FIG. 19A and as has been described previously, the crash boxes 9, 9 are buckled and deformed to cause the bumper beam 2 to retreat. Accordingly, the radiator support part 56 receives the impact load to shift rearward relative to the reinforcing part 55, with a result that the radiator support part 56 and the radiator R move rearward. Hence, interference of the bumper beam 2 with the radiator R can be prevented even when the bumper beam 2 retreats, thereby preventing the radiator R from being broken at light collision. As shown in FIG. 20A, the radiator support part 56 and the radiator R retreat inside the frame of the reinforcing part 55 of the shroud panel 5, thereby definitely preventing interference with the bumper beam 2.

Figure 19B:
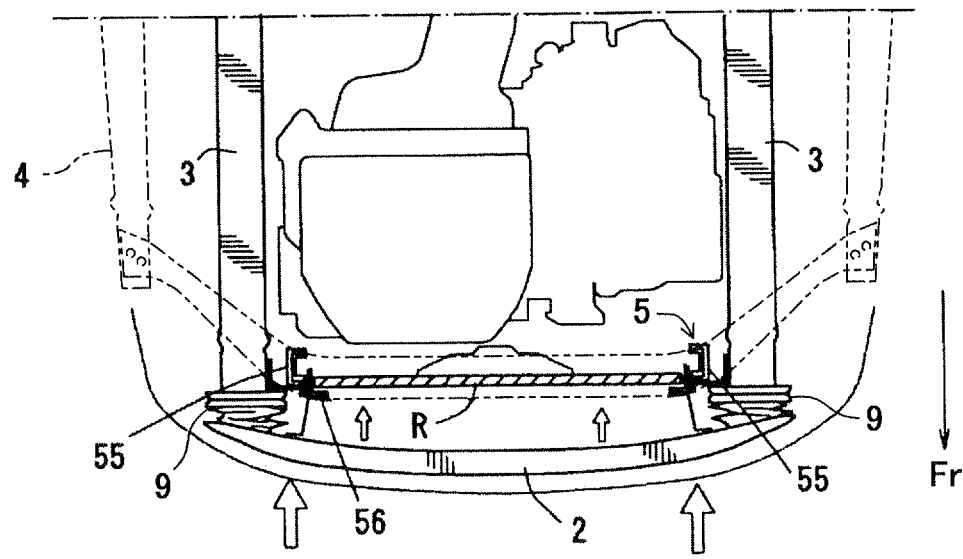
FIG. 19B is a view corresponding to FIG. 16 which shows behavior of the automobile at heavy collision in Embodiment 4.

Referring to a case of heavy collision, as shown in FIG. 19B, the bumper beam 2 further retreats to cause the impact load to be transmitted to the front side frames 3, 3. The impact load transmitted to the front side frames 3, 3 works on the reinforcing part 55 of the shroud panel 5 through the mounting plates 82, 82. Since the reinforcing part 55 is fastened and fixed to the apron rein members 4, 4, the impact load transmitted to the front side frames 3, 3 is transmitted to the apron rein members 4, 4 through the reinforcing part 55. Thus, the impact load can be distributed through the aforementioned under and upper load paths, thereby increasing the safety performance at collision of the automobile by utilizing the reinforcing part 55 of the shroud panel 5.

Figure 20B:
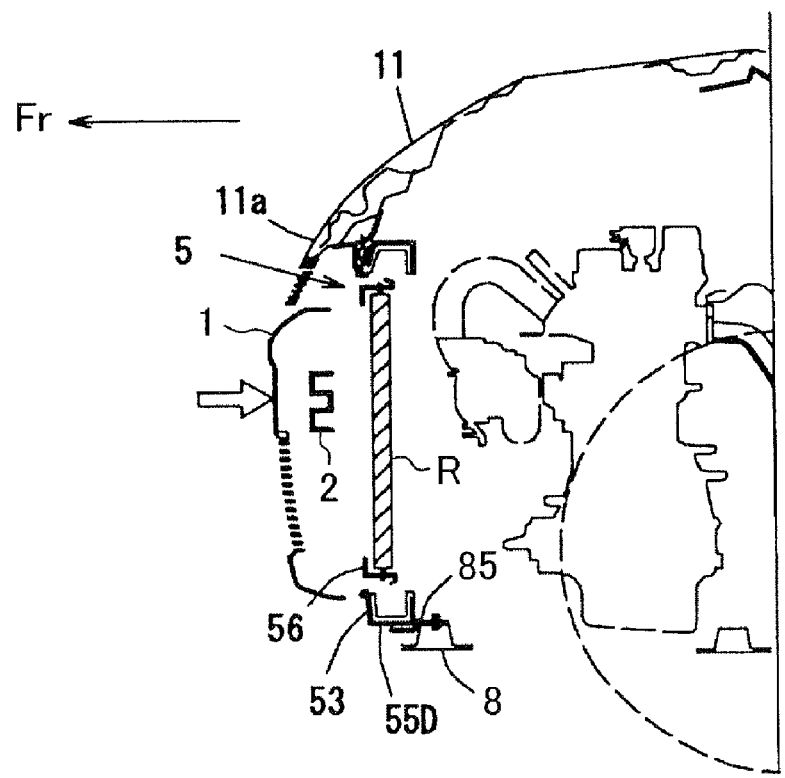
FIG. 20B is a side view of the front end part of the automobile which shows behavior of the automobile at heavy collision in Embodiment 4.

Further, as shown in FIG. 20B, the lower reinforcing part 55D of the lower part 53 of the shroud panel 5 is fixed to the perimeter frame 8, so that the impact load can be transmitted to the perimeter frame 8 through the joint plates 85, 85. Hence, the impact load distribution performance can be further enhanced.

Effects of the thus arranged front end structure of the present embodiment will be described next.

In the present embodiment, the panel support part is composed of the reinforcing part 55 integrally formed with the shroud panel 5 and including the metal-made reinforcement 54, and the shroud panel 5 includes the radiator support part 56 including the front end part located ahead of the reinforcing part 55 (the frame-like reinforcing part 55E) and supporting the radiator R and the thin to-be-broken part 58 formed at the boundary part between the reinforcing part 55 and the radiator support part 56.

This arrangement allows the bumper beam 2 to retreat upon head-on collision of the automobile so that the radiator support part 56 receives the impact load of the collision to retreat. At light collision, the thin to-be-broken part 58 is broken to shift the radiator support part 56 relative to the reinforcing part 55, thereby causing the radiator R to retreat. Thus, interference of the bumper beam 2 with the radiator R can be prevented. As a result, the radiator R supported by the shroud panel 5 can be prevented from being broken.

At heavy collision, in contrast, the impact load transmitted to the front side frames 3, 3 is distributed ant transmitted to the apron rein members 4, 4 and the perimeter frame 8 through the reinforcing part 55.

Hence, in the front end structure of the automobile in which the resin-made shroud panel 5 supports the radiator R, the load distribution performance of the shroud panel 5 to the car body members at heavy collision can be enhanced while the repair cost can be reduced by preventing the radiator R from being broken as far as possible at light collision.

Further, in the present embodiment, the thin to-be-broken part 58 is formed simultaneously with formation of the shroud panel 5, which means easy formation of the thin to-be-broken part 58 and invites no lowering of the productivity of the shroud panel 5.

Figure 21:
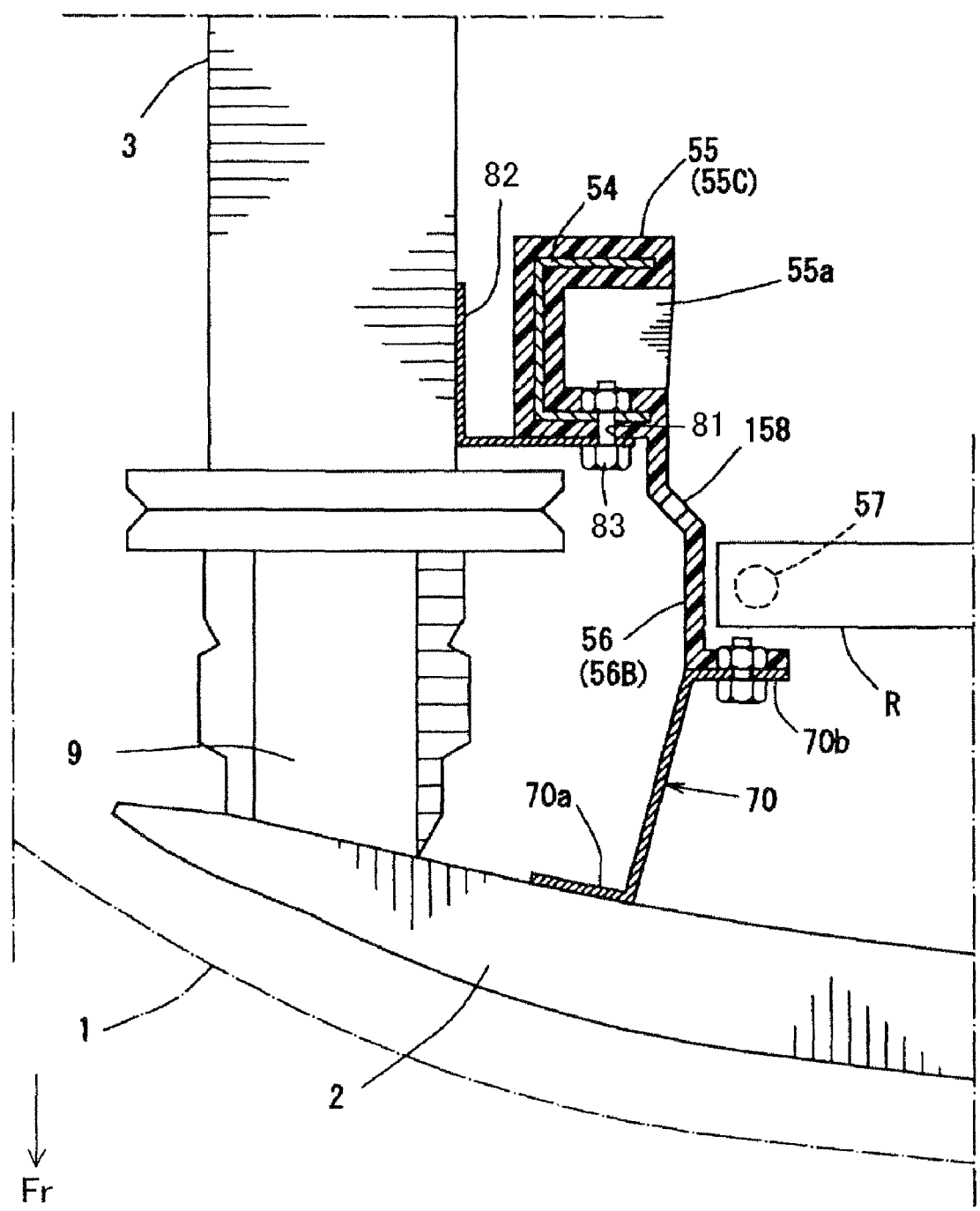
FIG. 21 is a view corresponding to FIG. 17 which shows another embodiment of a fragile part of the shroud panel in Embodiment 4.

Rather than the thin to-be-broken part 58, a slip part 158 shown in FIG. 21 may be formed as a fragile part at the boundary part between the reinforcing part 55 and the radiator support part 56. Formation of the slit part 158 promotes breakage of the boundary part upon reception of an impact load, thereby contemplating both protection of the radiator R at light collision and enhancement of the load distribution performance at heavy collision. The slit part 158 can be formed simultaneously with formation of the shroud panel 5, likewise formation of the thin to-be-broken part 58, and therefore, no lowering of the productivity of the shroud panel 5 is involved.

In the present embodiment, the upper part 51, the side parts 52, 52, and the lower part 53 of the shroud panel 5 form the reinforcing part 55, that is, the frame-like reinforcing part 55E to surround the radiator R, the arm reinforcing parts 55A, 55A are fixed to the apron rein members 4, 4, and the side reinforcing parts 55C, 55C of the side parts 52, 52 are fixed to the front side frames 3, 3.

With this arrangement, an impact load working on the front side frames 3, 3 at heavy collision can be transmitted to the apron rein members 4, 4 through the reinforcing part 55 definitely. Accordingly, load distribution at heavy collision can be performed definitely and appropriately to enhance the safety performance at heavy collision of the automobile.

Furthermore, in the present embodiment, the lower reinforcing part 55D of the lower part 53 of the shroud panel 5 is fixed to the perimeter frame 8. This arrangement secures fixing of the lower part 53 to cause relative shift of the radiator support part 56 definitely at light collision, thereby allowing the radiator R and the radiator support part 56 to retreat. At heavy collision, in contrast, the impact load can be transmitted to the perimeter frame 8 through the lower part 53. Hence, utilization of the perimeter frame 8 enhances both the protection performance for the radiator R at light collision and the load distribution performance at heavy collision.

The joint plates 70 are provided between the radiator support part 56 and the bumper beam 2 in the present embodiment, so that the radiator support part 56 retreats together with the bumper beam 2 upon head-on collision of the automobile. This involves no interference of the radiator R supported by the radiator support part 56 with the bumper beam 2 to prevent definitely the radiator R from being broken. Definite prevention of the radiator R from being broken leads to contemplation of reduction in repair cost.

In the present embodiment, the bonnet locking mechanism BL for locking the bonnet 11 is arranged at the upper reinforcing part 55B to be prevented from retreating even when the radiator support part 56 is broken and separates from the reinforcing part 55 at light collision. Thus, the bonnet locking mechanism BL increases the supporting rigidity of the bonnet 11 at collision.

Moreover, in the present embodiment, since the reinforcing part 55 is fixed to the car body members, namely, the front side frames 3, 3, the apron rein members 4, 4, and the perimeter frame 8 behind the crash boxes 9, 9, firm fixing of the reinforcing part 55 to the car body members is maintained with no influence of buckling and deformation of the crash boxes 9, 9 at light collision received. As a result, the reinforcing part 55 will not shift at light collision to cause relative shift between the reinforcing part 55 and the radiator support part 56, thereby definitely causing breakage of the thin to-be-broken part 58. Upon heavy collision, the impact load is transmitted to the car body members appropriately to thus enhance the load distribution performance.

It is preferable to fix the reinforcing part 55 to a plurality of car body members so that an impact load is transmitted from one kind of car body members, preferably, the front side frames 3, 3 to the other car body members through the reinforcing part 55. The other car body members may be car body panels, such as a wheel house apron and the like in addition to the apron rein members 4, 4 and the perimeter frame 8.

Embodiment 5

Figure 22:
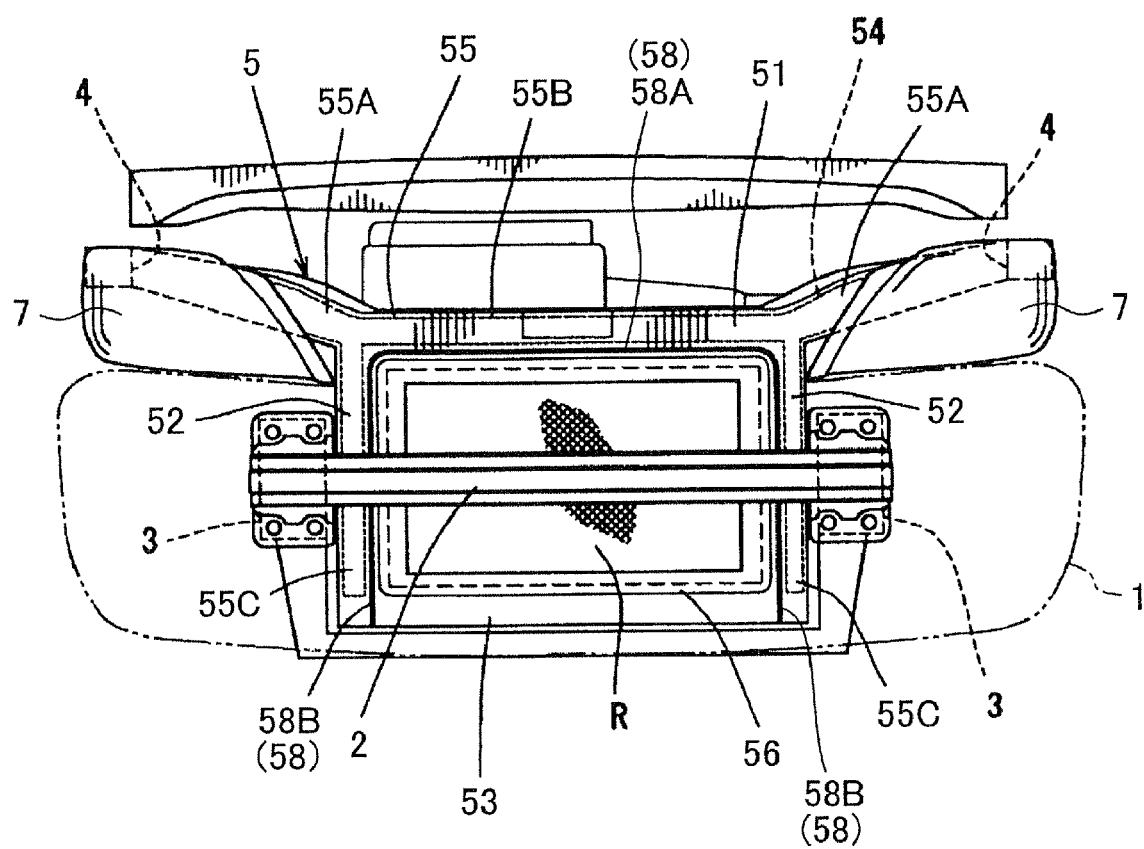
FIG. 22 is a view showing Embodiment 5 of the present invention and corresponding to FIG. 1.

FIG. 22 shows Embodiment 5 of the present invention, in which the structure of the reinforcing part 55 of the shroud panel 5 is different from that in Embodiment 4.

In detail, in the present embodiment, the lower reinforcing part 55D is not formed at the lower part 53 so that the reinforcing part 55 is composed of the arm reinforcing parts 55A, 55A and the upper reinforcing part 55B of the upper part 51 and the side reinforcing parts 55C, 55C of the side parts 52, 52.

Further, the thin to-be-broken part 58 formed at the boundary part between the reinforcing part 55 of the shroud panel 5 and the radiator support part 56 is not formed annularly but is composed of an upper part 58A formed at the boundary part between the upper reinforcing part 55B and an upper frame part 56A of the radiator support part 56 and right and left two side parts 58B, 58B formed at the boundary part between the side reinforcing parts 55C, 55C and the side frame parts 56B, 56B. The side parts 58B, 58B extend in the vertical direction from the right and left side ends of the upper part 58A to the lower end of the shroud panel 5.

In the present embodiment, similarly to Embodiment 4, the reinforcing part 55 is fastened and fixed to the front side frames 3, 3 and the apron rein members 4, 4. With no lower reinforcing part 55D formed, which is the difference from the above description, the same impact load distribution performance at heavy collision as in Embodiment 4 can be obtained.

With no lower reinforcing part 55D at the lower part 53, the lower part 53 is not fixed to the perimeter frame 8 in the present embodiment but may be fixed to the perimeter frame 8.

Upon light collision, the thin to-be-broken part 58 is broken to cause rearward movement of the radiator support part 56 and the radiator R, thereby preventing the radiator R from being broken at light collision.

With no lower reinforcing part 55D formed, the amount of the metal-made rein member 54 can be reduced, leading to reduction in weight of the shroud panel 5 when compared with that in Embodiment 4. Further, insert molding of the rein member 54 is facilitated.

Hence, in the present embodiment, the weight of the front end part of the automobile can be reduced to enhance the safety in automobile maneuver. In addition, the load transmission performance of the shroud panel 5 at heavy collision can be enhanced without inviting lowering of the formability of the shroud panel 5.

Embodiment 6

Figure 23:
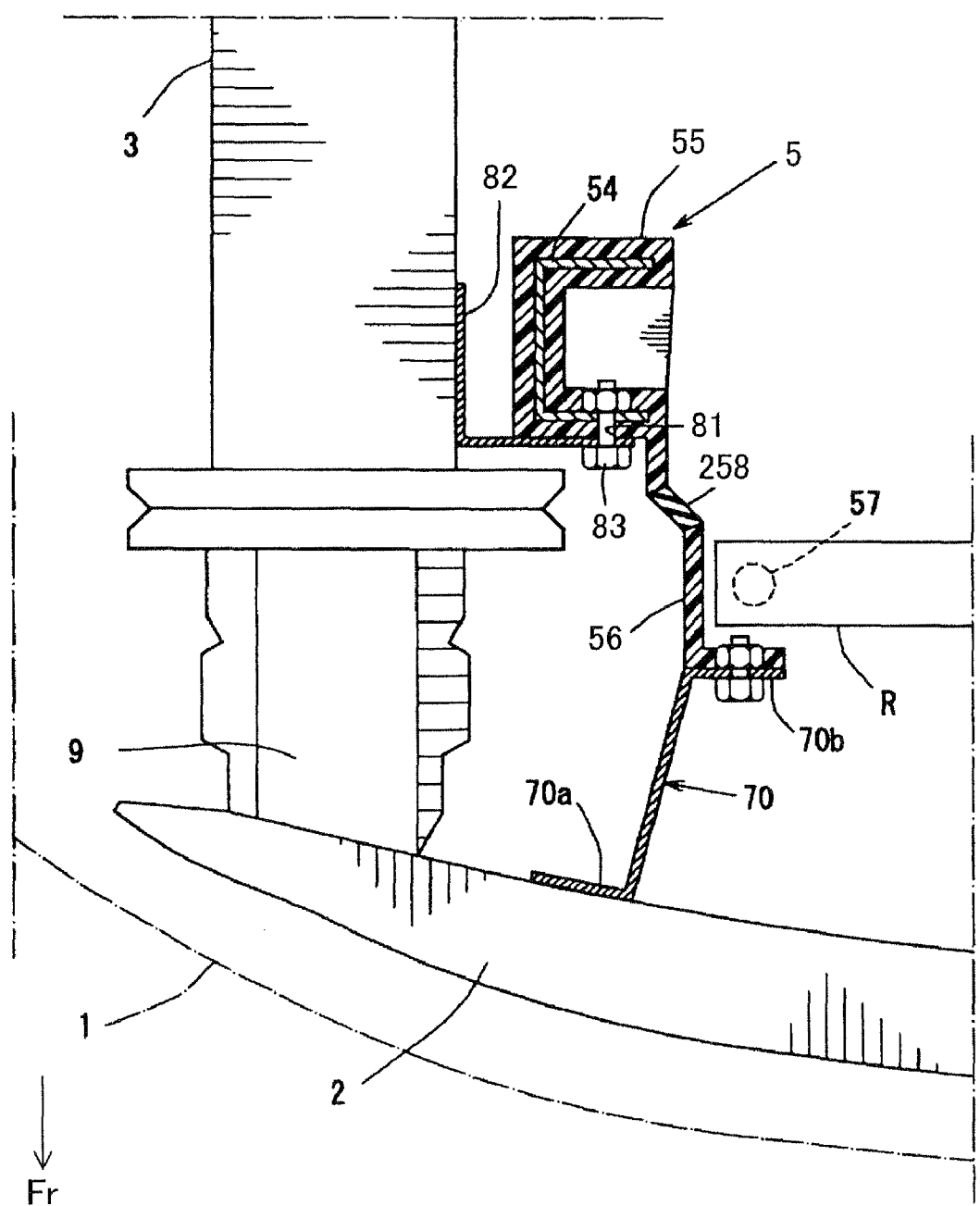
FIG. 23 is a view showing Embodiment 6 of the present invention and corresponding to FIG. 1.

FIG. 23 shows Embodiment 6 of the present invention, in which the boundary part between the reinforcing part 55 of the shroud panel 5 and the radiator support part 56 is different in structure from those in Embodiment 4 and 5.

In detail, in the present embodiment, the boundary part is composed of a rubber member 258 as a fragile part. The rubber member 258 is interposed between the reinforcing part 55 and the radiator support part 56 by adhesion and fixing of the resin-made reinforcing part 55 to the radiator support part 56.

The reinforcing part 55 includes, similarly to that in Embodiment 4, the frame-like reinforcing part 55E and is fastened and fixed to the front side frames 3, 3, the apron rein members 4, 4, and the perimeter frame 8. The rubber member 258 is formed annularly.

The rubber member 258 is elastically deformed upon light collision to cause the radiator support part 56 and the radiator R to shift relative to the reinforcing part 55, thereby preventing interference of the bumper beam 2 with the radiator R.

In contrast, upon heavy collision, the impact load working on the front side frames 3, 3 is definitely transmitted to the apron rein members 4, 4 and the perimeter frame 8 through the reinforcing part 55, thereby enhancing the safety performance of the automobile at collision.

Particularly, in the present embodiment, elastic deformation of the rubber member 258 causes relative shift of the radiator support part 56. Accordingly, in contrast to Embodiments 4 and 5, breakage of the shroud panel 5 is not involved to prevent the radiator R from being broken, and accordingly, it becomes unnecessary to replace the shroud panel 5 itself for repair necessitated by light collision. Hence, further reduction in repair cost can be contemplate.

Even in the case where the reinforcing part 55 includes no lower reinforcing part 55D, as in Embodiment 5, the rubber member 258 can be formed at the boundary part between the reinforcing part 55 and the radiator support part 56.

The present invention is not limited to the above embodiments and applicable to front end structures of various kinds of automobiles.

What is claimed is:

1. A front end structure for an automobile, comprising:
   a shroud panel for supporting a heat exchanger which includes:
     an upper part extending in a car width direction;
     a lower part extending in the car width direction; and
     two side parts extending in a vertical direction to connect the upper part and the lower part;
   a front bumper including a bumper beam extending in the car width direction on an automobile front side of the shroud panel;
   a panel support part supporting the shroud panel against car body members; and
   a rearward movement allowing part which allows the shroud panel and the heat exchanger to move rearward of the automobile relative to the panel support part when an impact load works on the shroud panel from front of the automobile; and
   a joint bracket for connecting the shroud panel and the bumper beam,
   wherein the joint bracket is configured such that, when an impact load works on the bumper beam from the front of the automobile, the impact load works on the shroud panel to move the shroud panel and the heat exchanger rearward of the automobile.

2. The front end structure of claim 1, wherein the panel support part extends in the car width direction above the shroud panel, and the rearward movement allowing part fixes the upper part of the shroud panel to the panel support part and allows, when the impact load works on the shroud panel from the front of the automobile, the upper part to separate from the panel support part.

3. A front end structure for an automobile, comprising:
   a resin-made shroud panel for supporting a heat exchanger which includes: an upper part extending in a car width direction; a lower part extending in the car width direction, and two side parts extending in a vertical direction to connect the upper part and the lower part;
   a front bumper including a bumper beam extending in the car width direction on an automobile front side of the shroud panel;
   a panel support part supporting the shroud panel against car body members; and a rearward movement allowing part which allows the heat exchanger to move rearward of the automobile relative to the panel support part when an impact load works on and the shroud panel from the front of the automobile,
   where in the panel support part extends in the car width direction about the shroud panel,
   the rearward movement allowing part fixes an upper part of the shroud panel to the panel support part and allows, when an impact load works on the shroud panel from the front of the automobile, the upper part to separate from the panel support part, and
   the panel support part includes:
   right and left side members respectively including rear end parts fixed to front end parts of respective right and left apron resin members as two of the car body members and front end parts located above front end parts of respective right and left front side frames as two of the car body members;
   right and left vertical members respectively including upper end parts fixed to the front end parts of the respective right and left side members and lower end parts fixed to the front end parts of the respective right and left front side frame; and
   a center member extending in the car width direction to connect the right and left side members, the center member being detachably fastened and fixed to the right and left side members.

4. The front end structure of claim 3, wherein the center member is capable of being fixed provisionally to an upper face of the upper part of the shroud panel before being mounted to the automobile.

5. A front end structure for an automobile, comprising:
 a resin-made shroud panel for supporting a heat exchanger which includes: an upper part extending in a car width direction; a lower part extending in the car width direction; and two side parts extending in a vertical direction to connect the upper part and the lower part;
 a front bumper including a bumper beam extending in the car width direction on an automobile front side of the shroud panel;
 a panel support part supporting the shroud panel against car body members; and
 a rearward movement allowing part which allows the heat exchanger to move rearward of the automobile relative to the panel support part when an impact load works on the shroud panel from the front of the automobile,
 where in the panel support part extends in the car width direction above the shroud panel,
 the rearward movement allowing part fixes an upper part of the shroud panel to the panel support part and allows, when an impact load works on the shroud panel from the front of the automobile, the upper part to separate from the panel support part,
 the panel support part includes a main body in a substantially reverse U shape in section along a longitudinal direction of the automobile and front and rear flanges formed at sides in the longitudinal direction of the automobile of the main body, and the rearward movement allowing part includes a joint member for fastening and fixing the upper part of the shroud panel to at least one of the flanges.

6. The front end structure of claim 5, wherein the joint member fastens and fixes the upper part of the shroud panel to the rear flange, a notch which is opened to rear of the automobile and through which the joint member is inserted is formed at a joint part by the joint member in the rear flange, and the rearward movement allowing part allows the upper part of the shroud panel to separate from the panel support part by separating the joint member from the notch when the impact load works on the shroud panel from the front of the automobile.

7. The front end structure of claim 5, wherein the joint member fastens and fixes the upper part of the shroud panel to the front flange, a notch which is opened to the front of the automobile and through which the joint member is inserted is formed at a joint part by the joint member in the upper part of the shroud panel, and the rearward movement allowing part allows the upper part of the shroud panel to separate from the panel support part by separating the joint member from the notch when the impact load works on the shroud panel from the front of the automobile.

8. A front end structure for an automobile, comprising:
 a resin-made shroud panel for supporting a heat exchanger which includes an upper part extending in a car width direction, a lower part extending in the car width direction, and two side parts extending in a vertical direction to connect the upper part and the lower part; a front bumper including a bumper beam extending in the car width direction on an automobile front side of the shroud panel;
 a panel support part extending in the car width direction above the shroud panel and supporting the shroud panel against car body members; and
 a fixing part fixing the upper part of the shroud panel to the panel support part and allowing, when an impact load works on the shroud panel from front of the automobile, the upper part to separate from the panel support part,
wherein the panel support part includes:
 right and left side members respectively including rear end parts fixed to front end parts of respective right and left apron rein members as two of the car body members and front end parts located above front end parts of respective right and left front side frames as two of the car body members;
 right and left vertical members respectively including upper end parts fixed to the front end parts of the respective right and left side members and lower end parts fixed to the front end parts of the respective right and left front side frames; and
 a center member extending in the car width direction to connect the right and left side members, the center member being detachably fastened and fixed to the right and left side members, and the side parts of the shroud panel are fixed to the bumper beam.

9. The front end structure of claim 2, wherein
the panel support part includes:
 right and left side members respectively including rear end parts fixed to the front and parts of respective right and left apron resin members as two of the car body members and front and parts located above the front and parts of respective right and left front side frames as two of the car body members;
 right and left vertical members respectively including upper and parts fixed to the front and part of the respective right and left side members and lower and parts fixed to the front and parts of the respective right and left front side frame; and
 a center member extending in the car width direction to connect the right and left side members, the center member being detachably fastened and fixed to the right and left side members.

10. The front end structure of claim 9, wherein
the center member is capable of being fixed provisionally to an upper face of the upper part of the shroud panel before being mounted to the automobile.

11. The front end structure of claim 2, wherein
the panel support part includes a main body in a substantially reverse U shape in section along a longitudinal direction of the automobile and front and rear flanges formed at sides in the longitudinal direction of the automobile of the main body, and
the rearward movement allowing part includes a joint member for fastening and fixing the upper part of the shroud panel to at least one of the flanges.

12. The front end structure of claim 11, wherein
the joint member fastens and fixes the upper part of the shroud panel to the rear flange,
a notch, which is opened to rear of the automobile and through which the joint member is inserted, is formed at a joint part by the joint member in the rear flange, and the rearward movement allowing part allows the upper part of the shroud panel to separate from the panel support part by separating the joint member from the notch when the impact load works on the shroud panel from the front of the automobile.

13. the front end structure of claim 11, wherein
the joint member fastens and fixes the upper part of the shroud panel to the front flange, a notch, which is opened to the front of the automobile and through which the joint member is inserted, is formed at a joint part by the joint member in the upper part of the shroud panel, and the rearward movement allowing part allows the upper part of the shroud panel to separate from the panel support part by separating the joint member from the notch when the impact load works on the shroud panel from the front of the automobile.

* * * * *